United States Patent
Shekhar et al.

(10) Patent No.: US 11,537,787 B2
(45) Date of Patent: Dec. 27, 2022

(54) TEMPLATE-BASED REDESIGN OF A DOCUMENT BASED ON DOCUMENT CONTENT

(71) Applicant: Adobe Inc., San Jose, CA (US)

(72) Inventors: Sumit Shekhar, Karnataka (IN); Vedant Raval, Gujarat (IN); Tripti Shukla, Uttar Pradesh (IN); Simarpreet singh Saluja, Punjab (IN); Paridhi Maheshwari, Karnataka (IN); Divyam Gupta, Rajasthan (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/188,302

(22) Filed: Mar. 1, 2021

(65) Prior Publication Data
US 2022/0277136 A1 Sep. 1, 2022

(51) Int. Cl.
*G06F 17/00* (2019.01)
*G06F 40/186* (2020.01)
*G06F 40/106* (2020.01)
*G06K 9/62* (2022.01)
*G06N 3/04* (2006.01)

(52) U.S. Cl.
CPC .......... *G06F 40/186* (2020.01); *G06F 40/106* (2020.01); *G06K 9/6228* (2013.01); *G06K 9/6256* (2013.01); *G06N 3/04* (2013.01)

(58) Field of Classification Search
CPC ... G06F 40/186; G06F 40/106; G06K 9/6256; G06N 3/04
USPC ........................................................ 715/243
See application file for complete search history.

(56) References Cited

U.S. PATENT DOCUMENTS

| | | | |
|---|---|---|---|
| 2012/0041985 A1* | 2/2012 | Engel | G06F 3/04842 707/E17.143 |
| 2014/0250395 A1* | 9/2014 | Tanaka | G06F 3/013 715/765 |
| 2015/0095785 A1* | 4/2015 | Edge | G06F 3/0481 715/731 |
| 2019/0156122 A1* | 5/2019 | Lu | G06K 9/6215 |
| 2019/0188882 A1* | 6/2019 | Son | G06T 3/0012 |

(Continued)

OTHER PUBLICATIONS

Get Started, Available online at: https://experience.sap.com/fiori-design-web/get-started/, Feb. 26, 2021, 7 pages.

(Continued)

*Primary Examiner* — Jason T Edwards
(74) *Attorney, Agent, or Firm* — Kilpatrick Townsend & Stockton LLP

(57) ABSTRACT

Certain embodiments involve a template-based redesign of documents based on the contents of documents. For instance, a computing system selects a template for modifying an input document. To do so, the computing system uses a generative adversarial network to generate an interpolated layout image from an input layout image, which represents the input document, and a template layout image, which represents the selected template. The computing system matches the input element to an interpolated element from the interpolated layout image. The computing system generates an output document by, for example, modifying a layout of the input document to match the interpolated layout image, such as by fitting the input element into a shape of the interpolated element.

20 Claims, 10 Drawing Sheets

(56) References Cited

U.S. PATENT DOCUMENTS

| | | | |
|---|---|---|---|
| 2019/0228115 A1* | 7/2019 | Bergin | G06F 3/04883 |
| 2021/0048931 A1* | 2/2021 | Barzelay | G06F 3/0485 |
| 2021/0124919 A1* | 4/2021 | Balakrishnan | G06V 10/7515 |
| 2021/0405825 A1* | 12/2021 | Narayanan | G06F 3/0481 |

OTHER PUBLICATIONS

Google Fonts, Available online at: https://fonts.google.com/, Accessed from Internet on: Mar. 4, 2021, pp. 1-103.

The Online Resume Builder You Deserve, Available online at: https://novoresume.com/, Accessed from Internet on: Mar. 4, 2021, 6 pages.

Baker, The Science of Color Contrast—An Expert Designer's Guide, Available online at: https://medium.muz.li/the-science-of-color-contrast-an-expert-designers-guide-33e84c41d156, Jun. 25, 2018, 7 pages.

Bayomi et al., A Novel Approach to Text Segmentation Using Ontological Similarity, IEEE International Conference on Data Mining Workshop (ICDMW), Nov. 14-17, 2015, 10 pages.

Campos et al., A Text Feature-based Automatic Keyword Extraction Method for Single Documents, European Conference on Information Retrieval, Advances in Information Retrieval, Feb. 2018, pp. 684-691.

Cho et al., Text2colors: Guiding Image Colorization Through Text-driven Palette Generation, Computational intelligence, Apr. 2018, 25 pages.

Karras et al., A Style-based Generator Architecture for Generative Adversarial Networks, IEEE/CVF Conference on Computer Vision and Pattern Recognition (CVPR), Jun. 15-20, 2019, 12 pages.

Klys et al., Learning Latent Subspaces in Variational Autoencoders, Advances in Neural Information Processing Systems 31 (NeurIPS 2018), Dec. 14, 2018, 15 pages.

Liao et al., Efficient Graph Generation with Graph Recurrent Attention Networks, Available online at: https://arxiv.org/pdf/1910.00760.pdf, Oct. 2, 2019, 13 pages.

Lindgaard et al., Attention Web Designers: You Have 50 Milliseconds to Make a Good First Impression!, Behaviour and Information Technology, vol. 25, No. 2, Mar. 2006, pp. 115-126.

Martin et al., Controllable Sentence Simplification, Available online at: https://arxiv.org/pdf/1910.02677.pdf, Oct. 2019, 10 pages.

Oord et al., Neural Discrete Representation Learning, Available online at: https://arxiv.org/pdf/1711.00937.pdf Nov. 2017, 11 pages.

Rao et al., Dear Sir or Madam, May I Introduce the GYAFC Dataset: Corpus, Benchmarks and Metrics for Formality Style Transfer, Proceedings of the 2018 Conference of the North American Chapter of the Association for Computational Linguistics: Human Language Technologies, vol. 1 (Long Papers), Jun. 2018, pp. 129-140.

Razavi et al., Generating Diverse High-Fidelity Images with VQ-VAE-2, Available online at: https://arxiv.org/pdf/1906.00446.pdf, Jun. 2019, 15 pages.

Sancheti et al., Reinforced Rewards Framework for Text Style Transfer, Advances in Information Retrieval, Apr. 2020, pp. 545-560.

Shirani et al., Let Me Choose: From Verbal Context to Font Selection, Proceedings of the 58th Annual Meeting of the Association for Computational Linguistics, Jul. 2020, pp. 8607-8613.

You et al., A Deep Generative Model for Graphs, Available online at: https://www.researchgate.net/publication/323411618_GraphRNN_A_Deep_Generative_Model_for_Graphs/link/5d6acafd92851c8538838409/download, Feb. 2018, 12 pages.

Zhong et al., Publaynet: Largest Dataset Ever for Document Layout Analysis, Conference: International Conference on Document Analysis and Recognition (ICDAR), Sep. 2019, 8 pages.

Zhu et al., Unpaired Image-to-Image Translation using Cycle-Consistent Adversarial Networks, Available Online at: https://arxiv.org/pdf/1703.10593.pdf, Jul. 19, 2018, 18 pages.

* cited by examiner

TEMPLATE-BASED REDESIGN OF A DOCUMENT BASED ON DOCUMENT CONTENT

TECHNICAL FIELD

This disclosure generally relates to document design. More specifically, but not by way of limitation, this disclosure relates to the template-based redesign of documents based on the contents of documents.

BACKGROUND

Studies show that the visual appeal of documents can be assessed within the first fifty milliseconds of viewing a document. Because readers decide whether and how to read a document based on this visual appeal, it is desirable for creators to create well-designed documents to provide a positive first impression. If a document does not provide visual appeal, a potential reader might consciously or subconsciously make a negative judgment about the usefulness of the document's content.

Multiple tools exist for document authoring and styling. However, document design tools are severely limited in their automation abilities. For instance, an existing tool allows a user to associate a text style definition, including font size and other characteristics, with certain text. When that definition changes, the associated text in the document changes as well. However, this tool does not assist the user in determining appropriate font characteristics. It takes considerable time and effort for a novice user to choose a good design template, which may include layout as well as text style definitions. Even after a design template is chosen, the user must manually modify the document layout and text styles to match those of the design template.

SUMMARY

Certain embodiments involve a template-based redesign of documents based on the contents of documents. For instance, a computing system selects a template for modifying an input document. In some embodiments, the computing system selects the template using a similarity graph having nodes representing input elements of the input document and the template as well as edges indicating degrees of similarity between different input and template elements. The computing system generates, with a generative adversarial network, an interpolated layout image from an input layout image representing the input document and a template layout image representing the selected template. The computing system matches the input element to an interpolated element from the interpolated layout image. The computing system generates an output document by, for example, modifying a layout of the input document to match the interpolated layout image, such as by fitting the input element into a shape of the interpolated element.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
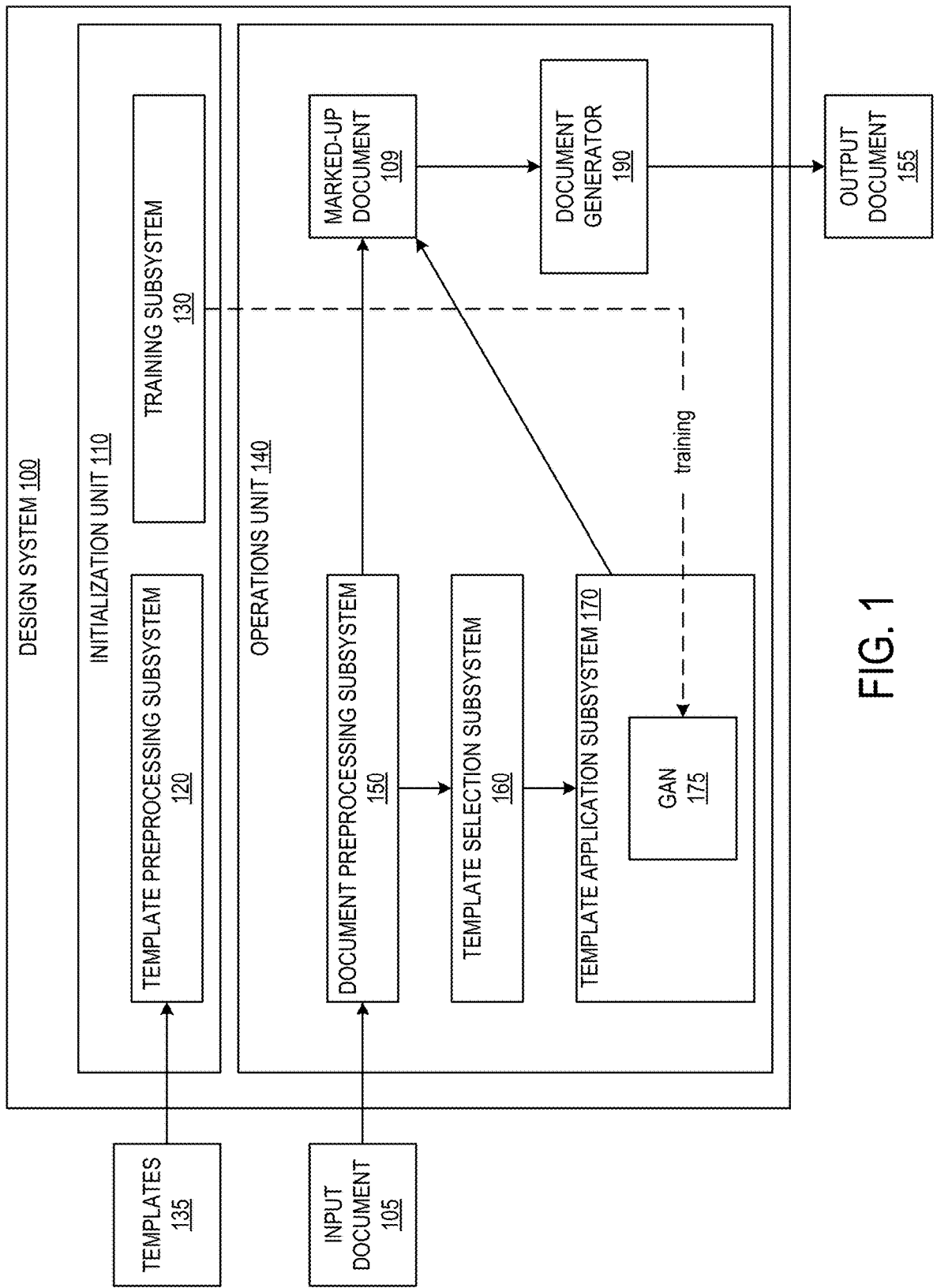
FIG. 1 is a diagram of an example of a design system for redesigning an input document, according to some embodiments described herein.

The present disclosure includes systems and methods for modifying properties of an input document to automatically redesign the input document based on its content. As explained above, although various tools exist for redesigning document manually, these tools lack intelligence in that such tools cannot intelligently recommend templates or other layout or stylistic details based on semantics of the document. Rather, existing design tools can present templates without feedback as to which of such templates is appropriate for a document, and such tools require manual intervention for application of styles associated with the template. Certain embodiments described herein improve upon existing tools by providing a solution that takes an input document and generates an output document with redesigned content. To this end, some embodiments use content similarities between available templates and the input document and, further, utilize a homomorphic interpolation generative adversarial network (GAN) to generate a layout and styles appropriate for the input document based on both the input document itself and the selected template.

The following non-limiting example is provided to introduce certain embodiments. In this example, a design system runs on a computing system. A user provides to the design system an input document that includes input elements such as a combination of text blocks (e.g., paragraphs or lists) and figures (e.g., images or tables). In this example, the computing system executes the design system, which has access to a set of templates. Each template is associated with respective template elements that have been identified in preprocessing of the templates. The design system selects a template deemed similar to the input document due to a similarity of template elements in the template to input elements in the input document. The design system automatically transfers styles from the selected template to text blocks of the input document.

This example of the design system generates an input layout image representing the input document. The input layout image is an image showing the layout of the input document in the form of a first set of bounding boxes, such that an input element of the input document is illustrated as a first bounding box. The first bounding box is associated with a tag that describes an element type (e.g., paragraph, list, heading, or figure) of the input element being represented. For instance, the tag is the color of the first bounding box, where that color corresponds to an element type of the input element, or the tag is a description of the input element as stored in an associated document.

The design system applies a trained homomorphic interpolation GAN, also referred to herein as simply a GAN, to the input layout image and a template layout image. The template layout image is a layout image representing the selected template. Similar to the input layout image, the template layout image is an image showing the layout of the selected template as a second set of bounding boxes, such that a template element of the template is illustrated as a second bounding box, which is associated with a respective tag. For instance, the tag is a color of the second bounding box, where that color corresponds to an element type of the template element being represented by the second bounding box. The GAN outputs an interpolated layout image, which represents a layout between the layout of the input document and the layout of the selected template. The interpolated layout image includes a third set of bounding boxes including, for instance, a third bounding box associated with a respective tag (e.g., color) indicating an element type. The design system matches input elements of the input document to bounding boxes in the interpolated layout image.

In this example, the design system generates an output document having a layout corresponding to the interpolated layout image. Specifically, to create the output document, the design system matches input elements of the input document to bounding boxes in the interpolated layout image. For instance, if the tag (e.g., the color or other description) of the input element is the same as the tag (e.g., the color) of the third bounding box in the interpolated layout image, and if the first bounding box and the third bounding box are similar in position and dimensions, the design system deems the input element to match that third bounding box. The design system modifies the various input elements such that the input element is fit into the third bounding box of the interpolated layout image, based on the input element having been matched to the third bounding box. In this manner, the layout of the input document is modified (i.e., redesigned) to more closely align with the interpolated layout image and thus with the selected template.

Certain embodiments described herein provide a solution for redesigning document. Given an input document, an embodiment of the design system modifies that input document in terms of both text styling and layout to construct an output document that is visually appealing, and does so based on actual content features of the input document. The problem of document redesign is a technical problem given that redesigning documents is not something that can be performed via pen and paper. While documents can be marked up in pen and paper, layout and text styling cannot be changed once a document exists outside of a computer or other device. Thus, the problem of how to redesign a document in terms of layout or text styling arises only in a computing environment. Embodiments herein present a solution to that problem. Specifically, some embodiments identify specific element types in an input document and then utilize a trained GAN to generate a new layout appropriate for the document based on those specific element types. The input document is then modified to fit into the new layout, thus resulting in a document redesign that is based on actual content of the input document. In other words, embodiments herein make a technical improvement to the technical field of document generation and design by automatically modifying properties of an input document to make that input document easier to consume.

OVERVIEW OF CERTAIN EMBODIMENTS

Referring now to the drawings, FIG. 1 is a diagram of an example of a design system 100, according to some embodiments described herein. In some embodiments, as shown in FIG. 1, the design system 100 includes an initialization unit 110 and an operations unit 140. Generally, the operations unit 140 of the design system 100 takes as input an input document 105 and generates and outputs an output document 155, where the output document 155 is a modified version (e.g., a redesigned version) of the input document 105.

In some embodiments, the initialization unit 110 performs initialization tasks prior to operation of the operations unit 140. The initialization unit 110 performs initializations tasks at least once but possibly more than once, for instance, if refinement is deemed necessary. The initialization unit 110 includes a template preprocessing subsystem 120 and a training subsystem 130. The template preprocessing subsystem 120 accesses a set of available templates 135 and preprocesses those available templates 135 to prepare them for use by the operations unit 140. Specifically, for instance, preprocessing an available template 135 includes one or more tasks such as extracting template elements from the available template 135, generating a respective template layout image representing a layout of each available template 135, or both. The training subsystem 130 trains a GAN 175 to interpolate between two layout images, such that the GAN 175 can later be used by the operations unit 140 to interpolate between a template layout image representing a selected template 135 (i.e., representing the layout of a selected template 135) and an input layout image representing an input document (i.e., representing the layout of an input document).

In some embodiments, the operations unit 140 includes a document preprocessing subsystem 150, a template selection subsystem 160, a template application subsystem 170, and a document generator 190. Generally, the document preprocessing subsystem 150 preprocesses an input document 105 received from a user, which can be a human or automated user. The preprocessing includes one or more tasks such as extracting input elements of the input document 105, generating an input layout image to represent a layout of the input document 105, or both. Additionally, the document preprocessing subsystem 150 may convert the input document 105 to one or more other formats of documents, such as an initial document, a common document, a testing document, and a marked-up document 109, to facilitate construction of the output document 155 as described herein. The template selection subsystem 160 automatically selects a template 135 from the available templates 135 based on comparing the input elements of the input document 105 to the respective template elements of the various available templates 135. In this manner, the template selection subsystem 160 identifies and selects a template 135 that is similar to the input document 105 in terms of content or, more specifically, in terms of element number and element type. The template application subsystem 170 applies the selected template 135 to the input document 105 through the use of the GAN 175, which was trained by the initialization unit 110. Specifically, the GAN 175 interpolates a layout image, referred to as an interpolated layout image, between the input layout image and the template layout image for the selected template 135. The template application subsystem 170 then matches input elements of the input document 105 to the interpolated layout image to determine how to modify the input elements to form elements of an output document 155. The template application subsystem 170 may implement such modifications in the marked-up document 109. The document generator 190 determines whether to apply additional styling modifications to the elements of the output document, and the document generator 190 renders the output document 155, for instance, from the marked-up document 109.

In some embodiments, one or more of (e.g., all of) the initialization unit 110, the template preprocessing subsystem 120, the training subsystem 130, the document preprocessing subsystem 150, the template selection subsystem 160, the template application subsystem 170, the modifications subsystem 180, and the document generator 190 are implemented as hardware, software, or a combination of hardware and software. For instance, each of these is implemented as a specialized hardware device, such as a field-programmable gate array, or as program code executable by a computer processor. The distinctions among the units and subsystems described herein are provided for illustrative purposes only, and the hardware or software making up these units and subsystems may be combined together or further divided. Additionally or alternatively, the units and subsystems may operate on a single computing device or may be distributed across multiple computing devices. Various implementations are possible and are within the scope of this disclosure.

In one example, the design system 100 is distributed across at least two computing devices, such that the operations unit 140 is executed by a server different from one or more computing devices that execute the initialization unit 110. In another example, the initialization unit 110 is further divided across at least two computing devices such that the template preprocessing subsystem 120 and the training subsystem 130 are executed on different computing devices. Additionally or alternatively, a user utilizes a client device to communicate with the operations unit 140, which runs as part of the design system 100 in a remote server. Through the client device, the user provides the input document 105, which is transmitted to the remote server. The remote server then executes the subsystems of the operations unit 140 to generate an output document 155, which the remote server then provides to the client device. In an alternative example, however, the client device runs the operations unit 140 locally. Various implementations are possible and are within the scope of this disclosure.

Figure 2:
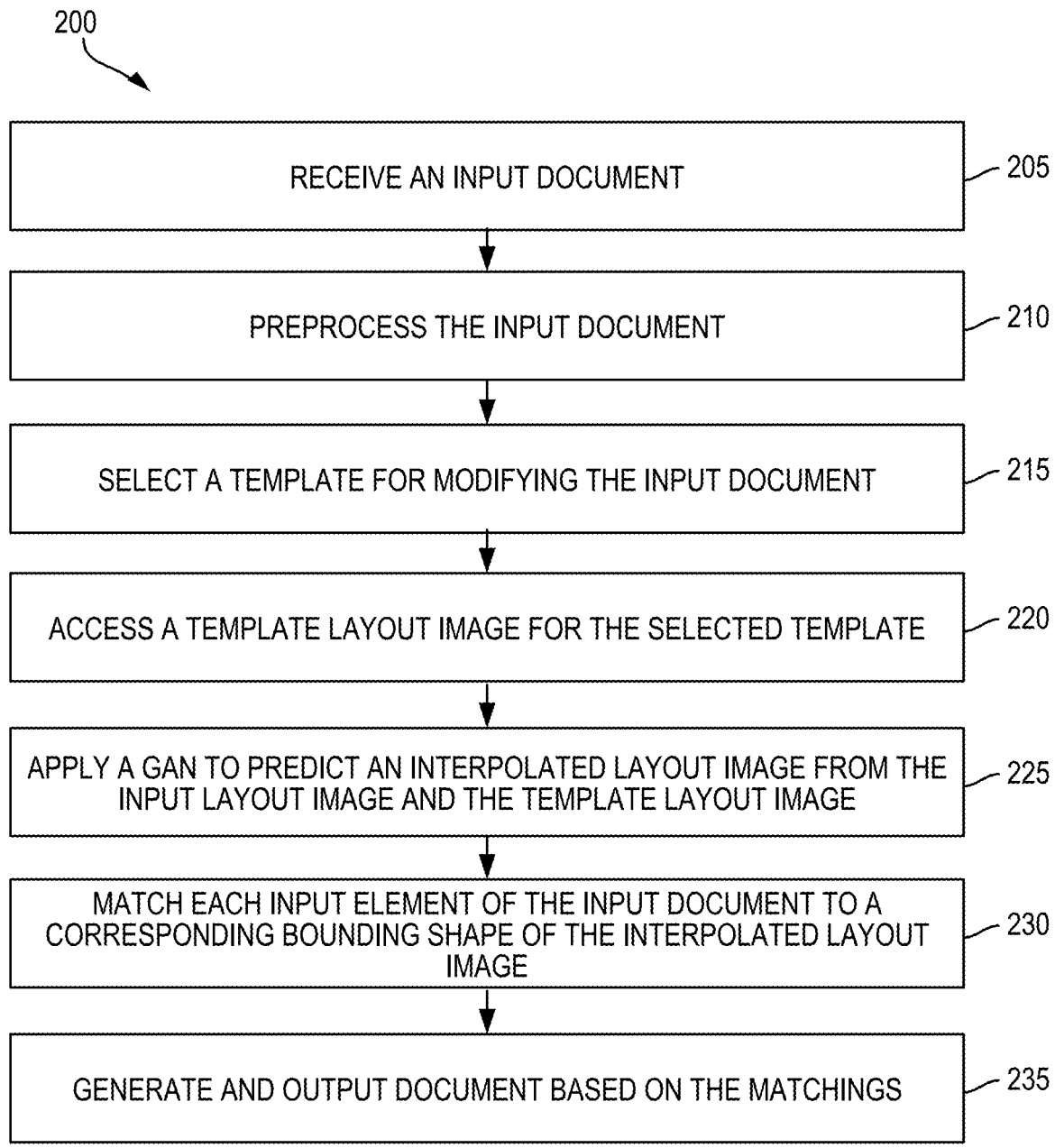
FIG. 2 is a diagram of an example of a process of applying a template to redesign the input document, according to some embodiments described herein.

FIG. 2 is a diagram of an example of a process 200 of redesigning an input document 105, according to some embodiments described herein. For instance, this process 200 is performed by the operations unit 140 of the design system 100, after the initialization unit 110 has already run to initialize aspects of the design system 100. The process 200 depicted in FIG. 2, as well as other processes described herein, may be implemented in software executed by one or more processing units, in hardware, or in a combination software and hardware. This process 200 is intended to be illustrative and non-limiting. Although FIG. 2 depicts various activities occurring in a particular sequence or order, this is not intended to be limiting. In certain embodiments, for instance, the activities may be performed in a different order, activities may be added or omitted, or one or more activities of the process 200 may be performed in parallel.

As shown in FIG. 2, at block 205, the process 200 involves receiving an input document 105. In some embodiments, the input document 105 is received from a user, which can be a human user or an automated user. The input document 105 can take various forms, such as a text document, a word-processing document, or a Portable Document Format (PDF) document.

At block 210, the process 200 involves preprocessing the input document 105. Preprocessing will be described in more detail below. However, in some embodiments, the document preprocessing subsystem 150 of the design system 100 preprocessing the input document 105 at least by extracting input elements and generating a layout image of the input document 105, also referred to as an input layout image.

Figure 3:
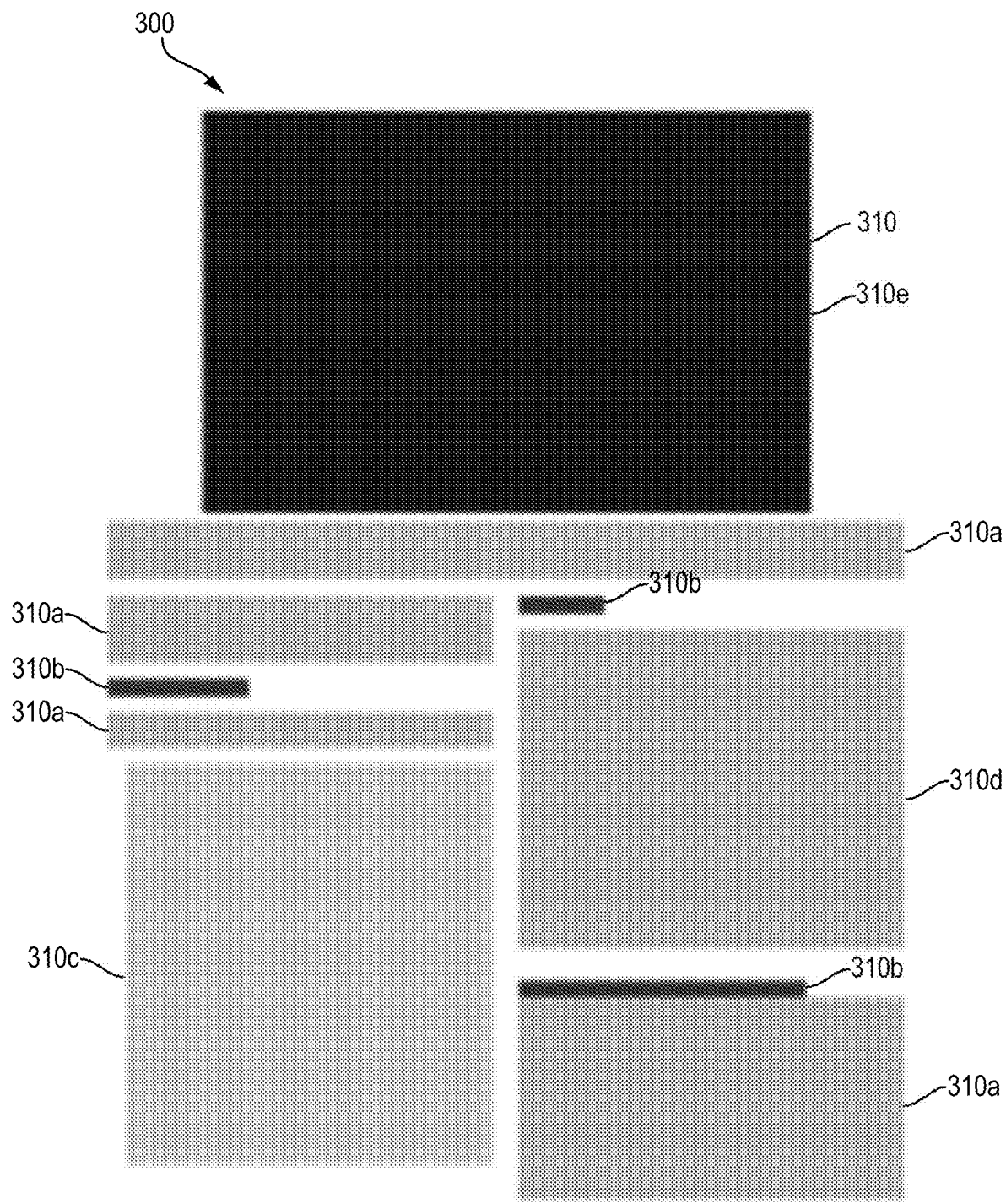
FIG. 3 is an example of a layout image, such as an input layout image representing an input document or a template layout image representing a template, according to some embodiments described herein.

FIG. 3 is an example of a layout image 300, such as an input layout image representing an input document 105 or a template layout image representing a template 135, according to some embodiments described herein. In some embodiments, each layout image represents a corresponding document, such as the input document 105 or a template 135. In some embodiments, a layout image 300 includes an arranged set of bounding shapes 310, such as bounding boxes. Each bounding shape 310 indicates the boundaries of a corresponding element, such as a text block element (e.g., a paragraph, list, or heading) or a figure (e.g., an image or table), of the document being represented by the layout image 300. The layout of the bounding shapes 310 in the layout image 300 corresponds to the layout of the corresponding elements in the document being represented, for instance, such that a bounding shape 310 for a first element takes the coordinates (e.g., the position and dimensions) of the first element in the corresponding document.

In some embodiments, each element type (i.e., each type or category of element) is associated with a unique color corresponding to that element type. For example, green is associated with paragraphs, and thus, paragraph bounding shapes 310a representing paragraphs are green; red is associated with headings, and thus, heading bounding shapes 310b representing headings are red; cyan is associated with lists, and thus, list bounding shapes 310c representing lists are cyan; yellow is associated with tables, and thus, table bounding shapes 310d representing tables are yellow; and blue is associated with images, and thus, image bounding shapes 310e representing images are blue. In a layout image 300, each bounding shape 310 is the color associated with the element type of the element represented by the bounding shape 310. Thus, the color of a bounding shape 310 acts as a tag to describe the element type of the element represented by the bounding shape 310. Tasks involved in generating a layout image from a document will be described in more detail below, with respect to FIG. 4.

Referring back to FIG. 2, at block 215, the process 200 involves selecting a template 135 for modifying the input document 105. In some embodiments, for instance, the template selection subsystem 160 selects the template 135 from among a set of available templates 135, based on the selected template 135 being deemed similar to the input document 105 and, thus, a good basis for redesigning the input document 105. Tasks involved in selecting a template 135 will be described in more detail below, with respect to FIG. 6.

At block 220, the process 200 involves accessing a template layout image representing the selected template 135 that was selected at block 215. In some embodiments, the template layout image is a layout image 300 representing the selected template 135. Like the input layout image, the template layout image includes an arranged set of bounding shapes 310 corresponding to template elements of the selected template 135, and each bounding shape 310 may have a color associated with the element type of its corresponding template element. As described in more detail below, particularly with respect to FIG. 5, the template preprocessing subsystem 120 preprocesses each available template 135, including generating a corresponding template layout image for each such available template 135. The template preprocessing subsystem 120 may preprocess the available templates 135 prior to execution of this process 200, such that the template layout image for the selected template 135 is already generated upon selection of the selected template 135.

At block 225, the process 200 involves applying a GAN 175, such as a homomorphic interpolation GAN, to predict an interpolated layout image from the input layout image and the template layout image. For instance, the template application subsystem 170 accesses the GAN 175, the input layout image, and the template layout image and applies the GAN 175 to the input layout image and the template layout image to produce the interpolated layout image. In some embodiments, like the input layout image and the template layout image, the interpolated layout image includes an arranged set of bounding shapes 310, where each bounding shape represents a corresponding interpolated element of a hypothetical interpolated document. The interpolated document itself need not be generated. Prior to this block 225 of the process 200, the training subsystem 130 has already trained the GAN 175 to perform such interpolations, as described in more detail with respect to FIG. 7.

At block 230, the process 200 involves matching each input element of the input document 105 to a corresponding bounding shape 310 of the interpolated layout image. In some embodiments, in this manner, the template application subsystem 170 selects a bounding shape 310 to represent each input element of the input document 105. When generating the output document 155, the bounding shape 310 matched to, and thus selected for, an input element determines the placement of that input element in the output document 155.

At block 235, the process 200 involves generating an output document 155. In some embodiments, the document generator 190 selects any additional changes to document elements, such as font changes or color changes, and then generates the output document 155 according to the matchings made at block 230 in addition to such additional changes, if any. Additional details of tasks involved in generating the output document 155 are described below, with respect to FIG. 9.

Example of Preprocessing an Input Document

Figure 4:
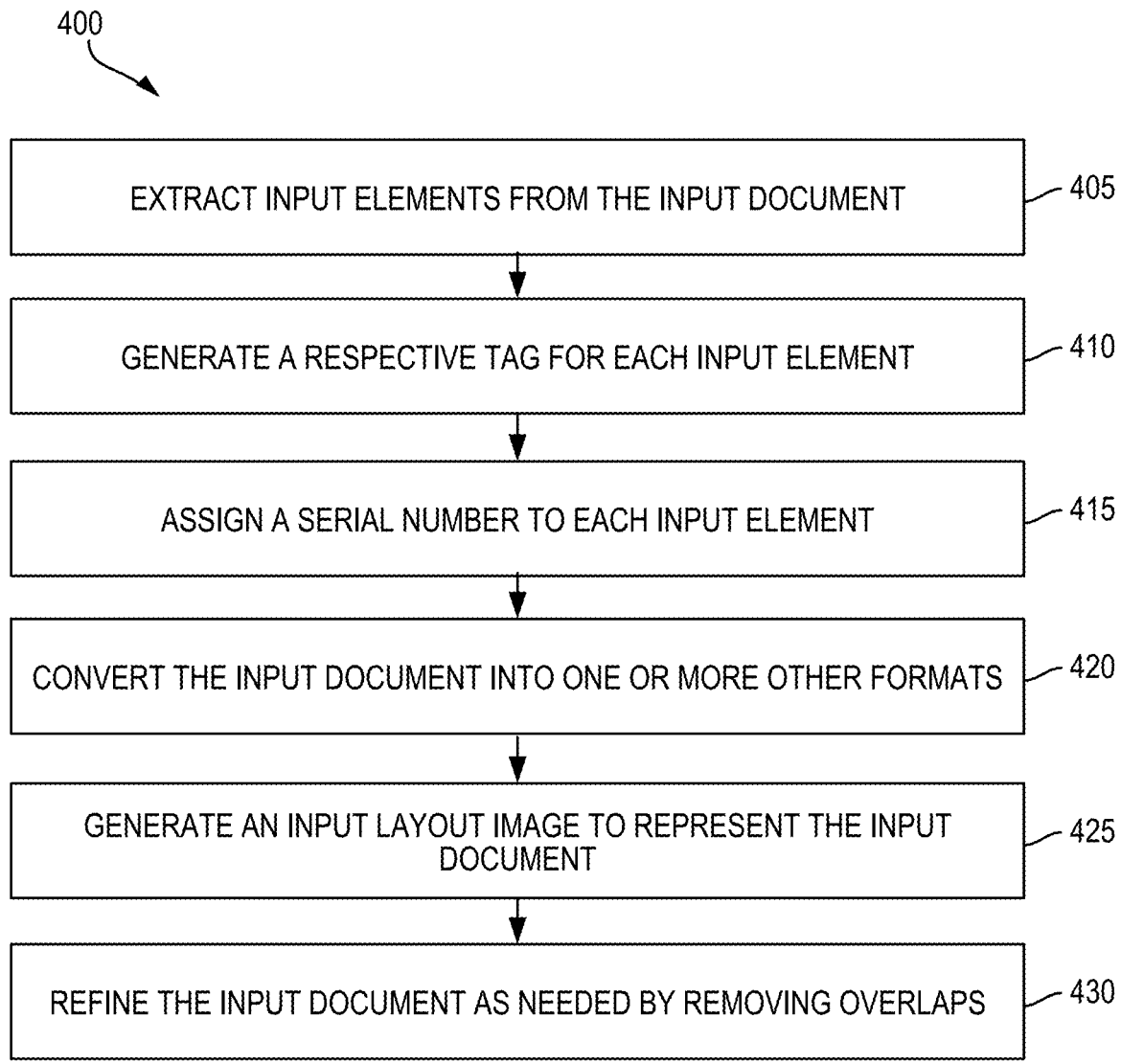
FIG. 4 is a diagram of an example of a process of preprocessing the input document, according to some embodiments described herein.

FIG. 4 is a diagram of an example of a process 400 of preprocessing an input document 105, according to some embodiments described herein. In some embodiments, the document preprocessing subsystem 150 of the design system 100 performs this process 400 or similar at block 210 of the above process 200 to preprocess the input document 105 received from the user, so as to enable redesigning of the input document 105 as described herein. The process 400 depicted in FIG. 4, as well as other processes described herein, may be implemented in software executed by one or more processing units, in hardware, or in a combination software and hardware. This process 400 is intended to be illustrative and non-limiting. Although FIG. 4 depicts various activities occurring in a particular sequence or order, this is not intended to be limiting. In certain embodiments, for instance, the activities may be performed in a different order, activities may be added or omitted, or one or more activities of the process 200 may be performed in parallel.

At block 405, the process 400 involves extracting input elements from the input document 105. For instance, an input element is a text block, also referred to as a text block element, such as paragraph, list, or heading, or an input element is a figure, such as a table or an image. Various techniques exist for automatically extracting (e.g., identifying) input elements of the input document 105, and one or more of such techniques can be used. In some embodiments, the specific technique used is dependent on the format of the input document 105. In one example, the input document 105 is a Portable Document Format (PDF) document, and the document preprocessing subsystem 150 uses a PDF toolkit to convert the input document 105 into an initial document, such as an initial JavaScript Open Notation (JSON) document. The PDF toolkit tool identifies each input element in the input document 105, the element type of each such input element, and the properties of each input element, and the PDF toolkit stores this information in the initial document.

At block 410, the process 400 involves generating a respective descriptor, or tag, that includes rendering properties of each input element of the input document 105. To this end, an embodiment of the document preprocessing subsystem 150 extracts rendering properties from the input document 105. For example, rendering properties of an element, such as an input element, include coordinates of a bounding shape 310 as well as text styles, such as font properties or color properties. In some embodiments, the document preprocessing subsystem 150 associates each input element with its corresponding rendering properties. For instance, in the above example of the input document 105 being a PDF document, the document preprocessing subsystem 150 utilizes the PDF toolkit, which determines such rendering properties, and stores the rendering properties in the initial document (e.g., in the initial JSON document). In one example, each input element of the input document 105 is represented in the initial document as an object, which as a descriptor for the input element, and which includes a set of attributes and values. Each pair of an attribute and a value describes an aspect of the associated input element such as coordinates of an original of the bounding shape 310, dimensions of the bounding shape 310, font family, font size, text styling (e.g., bold, italics), text color, or background color. In this manner, each input element is thus tagged (i.e., associated with) a descriptor, with each descriptor being the set of attribute-value pairs associated with the input element in the initial document. However, various techniques for determining rendering properties and generating tags are possible and are within the scope of this disclosure.

At block 415, the process 400 involves assigning a serial number to each element for later use. The serial numbers may be used for identification purposes throughout this disclosure. For instance, each object representing an input element in the initial document includes, as an attribute-value pair, the serial number assigned to that element. Additionally or alternatively, in another example, in the case of an input element that is a figure, the document preprocessing subsystem 150 extracts the figure itself, such as in an image format, and stores the figure in a file associated with the serial number of the input element. In this manner, the figure can later be retrieved based on the association of that serial number with the input element.

At block 420, the process 400 involves, if needed, converting the input document 105 to a format that can be easily manipulated by tools that will be used for applying a selected template 135. For instance, the document preprocessing subsystem 150 converts the initial document into variations of the input document 105 in one or more other formats, such as a common document and a testing document, each of which are JSON documents in some embodiments. The common document may have a format that lacks certain ambiguities potentially present in the initial document. For instance, an initial document and a template could be represented in an initial JSON format. The initial JSON format is a container containing information. Word grouping for the initial document in this initial JSON format could be different from word grouping for the template in this initial JSON format. These differences in word grouping could present ambiguities regarding which portions of the initial document should be matched to portions of the template. For instance, an initial JSON obtained from a PDF could include various ambiguities, such as word level separations for a word such as "together" appearing as two containers with the text "toge" and "ther," certain characters having missing parameters such as a null in the dimensions of the rectangle enclosing it, and incorrect labels such as text being associated with an artifact label. The document preprocessing subsystem 150 removes such ambiguities to produce the common document. For instance, the common document may be provided in a custom version of JSON and may be constructed in various ways, as long as that format is consistently used throughout the design system 100. The testing document may be a JSON format matching the JSON format used in a dataset used to the train or test the GAN 175. The PublayNet dataset can be used for document layout analysis and training of models used to generate or modify document layouts. For instance, a Publyanet JSON file is a JSON file having box coordinates with class types, disregarding the text in the document page. The Publyanet JSON can be the input format for a GAN 175 used to synthesize an intermediate layout image. In one example, the PublayNet dataset is used for training or testing the GAN 175, and thus, the document preprocessing subsystem 150 converts the initial document or the common document into a testing document in a PublayNet JSON format.

At block 425, the process 400 involves generating an input layout image to represent the input document 105. In some embodiments, this block 425 of the process 400 can be used to implement a step for generating an input layout image, where the input layout image includes bounding shapes 310 representing input elements of the input document 105, and where those bounding shapes 310 are tagged with descriptions of the input elements represented.

As described above, the input layout image includes an arranged set of bounding shapes 310, such as bounding boxes, with each bounding shape 310 representing a corresponding input element of the input document 105. In some embodiments, having identified each input element and its rendering properties in blocks 405-410 above, the document preprocessing subsystem 150 generates this input layout image. For instance, to generate the input layout image, the document preprocessing subsystem 150 considers each input element of the input document 105, such as by accessing the corresponding descriptor of each such element in the common document or some other version of the input document 105. For each input element, the document preprocessing subsystem 150 maps the input element to the color corresponding to the element type of the element. The document preprocessing subsystem 150 then generates a bounding shape 310, such as a bounding box, in the input layout image such that the bounding shape 310 has coordinates of the input element's position in the input document 105, or otherwise based on the element's position in the input document 105, and such that the bounding shape 310 has the color corresponding to the element type. The color of a bounding shape 310 thus acts as a tag to describe the element type of the element being represented.

In some embodiments, if the input document 105 has multiple pages, then the document preprocessing subsystem 150 generates a respective input layout image for each page. In that case, certain operations performed on an input layout image as described herein are performed for each input layout image representing the input document 105.

In some embodiments, each bounding shape 310 of the input layout image therefore corresponds to, and is thus associated with, a respective element of the input document 105. Further, because each input element of the input document 105 also corresponds to, and is associated with, a descriptor generated at block 410, each bounding shape 310 is similarly associated with the descriptor corresponding to the input element represented by that bounding shape 310. As will be described in detail below, the input layout image is later used to apply a selected template 135 to the input document 105.

At block 430, the process 400 involves refining the input document 105 to facilitate application of a selected template 135. In some embodiments, the document preprocessing subsystem 150 renders, or generates, a representation of the input document 105 as a marked-up document 109 based on the common document or some other version of the input document 105. In one example, the marked-up document 109 is an HTML document. The marked-up document 109 is in a format that facilitates ease of rendering.

In some embodiments, to generate the marked-up document 109, the document preprocessing subsystem 150 processes the common document, or some other version of the input document 105, to remove overlaps of bounding shapes 310 or to select appropriate font sizes, or both, as needed. Specifically, for example, the document preprocessing subsystem 150 utilizes the coordinates of the various bounding shapes 310 of the input elements to identify each overlap of bounding shapes 310. For instance, adjacent bounding shapes 310 are deemed overlapping if any distance between them does not meet a threshold value. For each overlap between bounding shapes 310, the document preprocessing subsystem 150 shifts or reduces the size of one or both bounding shapes 310 to eliminate the overlap. If a bounding shape 310 is modified in such a manner, the document preprocessing subsystem 150 may also modify (e.g., reduce) the font size or other applicable size of the corresponding input element to ensure that the input element continues to fit inside the bounding shape 310. The document preprocessing subsystem 150 records such modifications of bounding shapes 310 and font sizes, or other modifications, by updating the testing document and the marked-up document 109 as needed.

As described above, in some embodiments, each bounding shape 310 of the input layout image is thus tagged in one or more manners. For instance, a bounding shape 310 is tagged by its color, which represents at least the element type of the input element represented. Additionally or alternatively, the bounding shape 310 is tagged by its description in the marked-up document 109, or other documents derived from the input document 105, which identifies the bounding shape 310 by position or dimension and includes additional information about the input element represented. As such, the input layout image is thus associated with various information about each input element represented therein.

In some embodiments, to generate the marked-up document, the document preprocessing subsystem 150 constructs a respective class (e.g., a Cascading Stylesheets class) for each input element of the input document 105 and defines that class to have the rendering properties of the input element, for instance, as stored in the common document. The properties of a class can include, for instance, coordinates of the bounding shape 310, font properties, or color properties. The document preprocessing subsystem 150 generates the marked-up document 109 by enclosing each input element, or each portion of an element, in a markup tag associated with the class defined for that element. As such, an HTML renderer would generate an HTML version of the input document 105 from the marked-up document 109 with each element having the rendering properties as defined in the corresponding class.

Example of Preprocessing Available Templates

Figure 5:
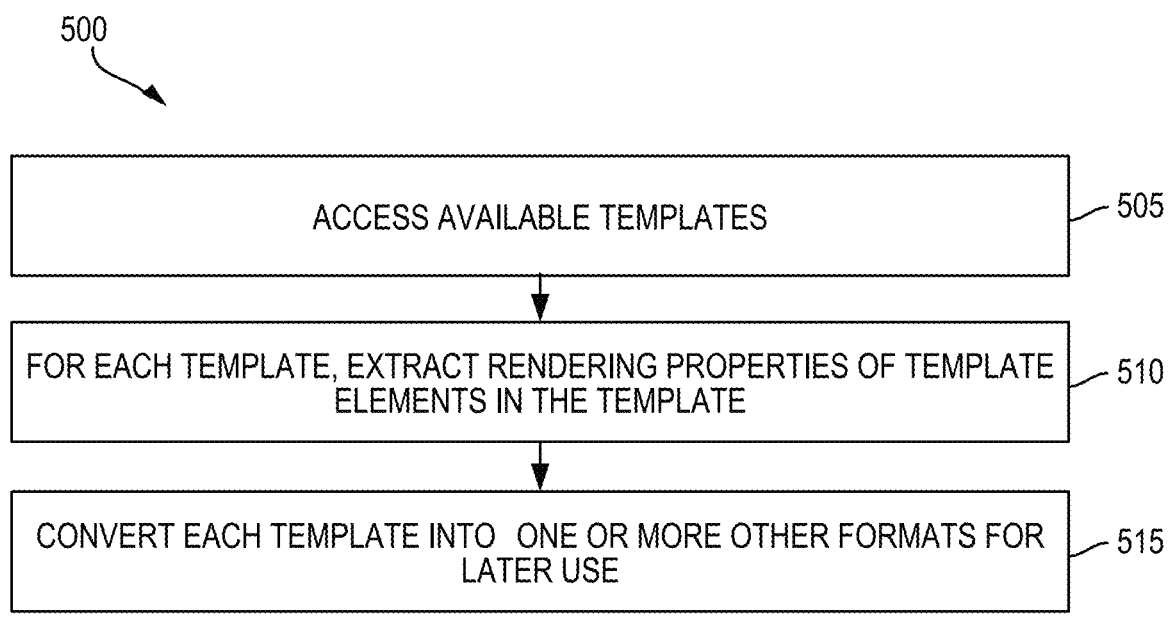
FIG. 5 is a diagram of an example of a process for preprocessing available templates, according to some embodiments described herein.

FIG. 5 is a diagram of an example of a process 500 for preprocessing available templates 135 to extract template elements and to generate template layout images, according to some embodiments described herein. In some embodiments, each template element is an element of a template 135. For example, a template element can be a text block element, such as a paragraph, list, or heading, or a template element can be a figure, such as a table or image. Each template layout image 300 is a layout image 300, as described above, representing a template 135. In one example, the template preprocessing subsystem 120 performs this process 500 or similar prior to block 215 of the above process 200 for redesigning an input document 105. This process 500 acts as part of initializing the design system 100, as performed by the initialization unit 110, and thus, this process 500 need not be repeated for each input document 105 but instead may be performed only once or as needed to preprocess templates 135.

The process 500 depicted in FIG. 5, as well as other processes described herein, may be implemented in software executed by one or more processing units, in hardware, or in a combination software and hardware. This process 500 is intended to be illustrative and non-limiting. Although FIG. 5 depicts various activities occurring in a particular sequence or order, this is not intended to be limiting. In certain embodiments, for instance, the activities may be performed in a different order, activities may be added or omitted, or one or more activities of the process 500 may be performed in parallel.

At block 505, the process 500 involves accessing available templates 135, also referred to herein as templates. In some embodiments, for instance, the templates 135 are InDesign templates collected from various sources. For instance, the InDesign templates can be collected from an existing archive or crowdsourced.

At block 510, the process 500 involves extracting rendering properties of template elements from the templates 135 accessed at block 505. In some embodiments, to this end, the template preprocessing subsystem 120 converts each template 135 to an InDesign Markup Language (IDML) document, unzips the IDML document to one or more Extensible Markup Language (XML) documents, and then converts the one or more XML documents to a JSON document, referred to a styles JSON document, representing the template. In one example, the template preprocessing subsystem 120 utilizes a batch script to process each template 135 through these conversions, resulting in a respective styles JSON document for each template 135.

In some embodiments, the template preprocessing subsystem 120 extracts the various text styles from each styles JSON document representing a respective template 135. For instance, a text style includes information describing font size, font family, justification, alignment, background color, font color, or background image related to a certain portion of text. This extraction may be performed in an automated manner, such as by parsing the styles JSON document automatically, or may be facilitated through input from a human user.

At block 515, the process 500 involves converting each template 135 into one or more other formats for use later. In some embodiments, converting to these formats includes converting each template 135 into a respective template common document, which may be the same format used for the common documents of input documents 105. In some embodiments, to this end, the template preprocessing subsystem 120 converts each template 135 into a tagged format, such as PDF, and extracts rendering properties from that tagged format, such as through the use of the PDF toolkit, to generate a template common document corresponding to the template. Various intermediate conversions, such as a conversion to remove certain ambiguities, may take place to produce the template common document.

Additionally, in some embodiments, the template preprocessing subsystem 120 converts each template 135 into a template testing document, which may be in a JSON format or other format used for training or testing the GAN 175. For instance, if the PublayNet dataset is being used for training or testing, then the template preprocessing subsystem 120 converts the template common document for each template into a corresponding template PublayNet JSON document as the template testing document.

Example of Selecting a Template

Figure 6:
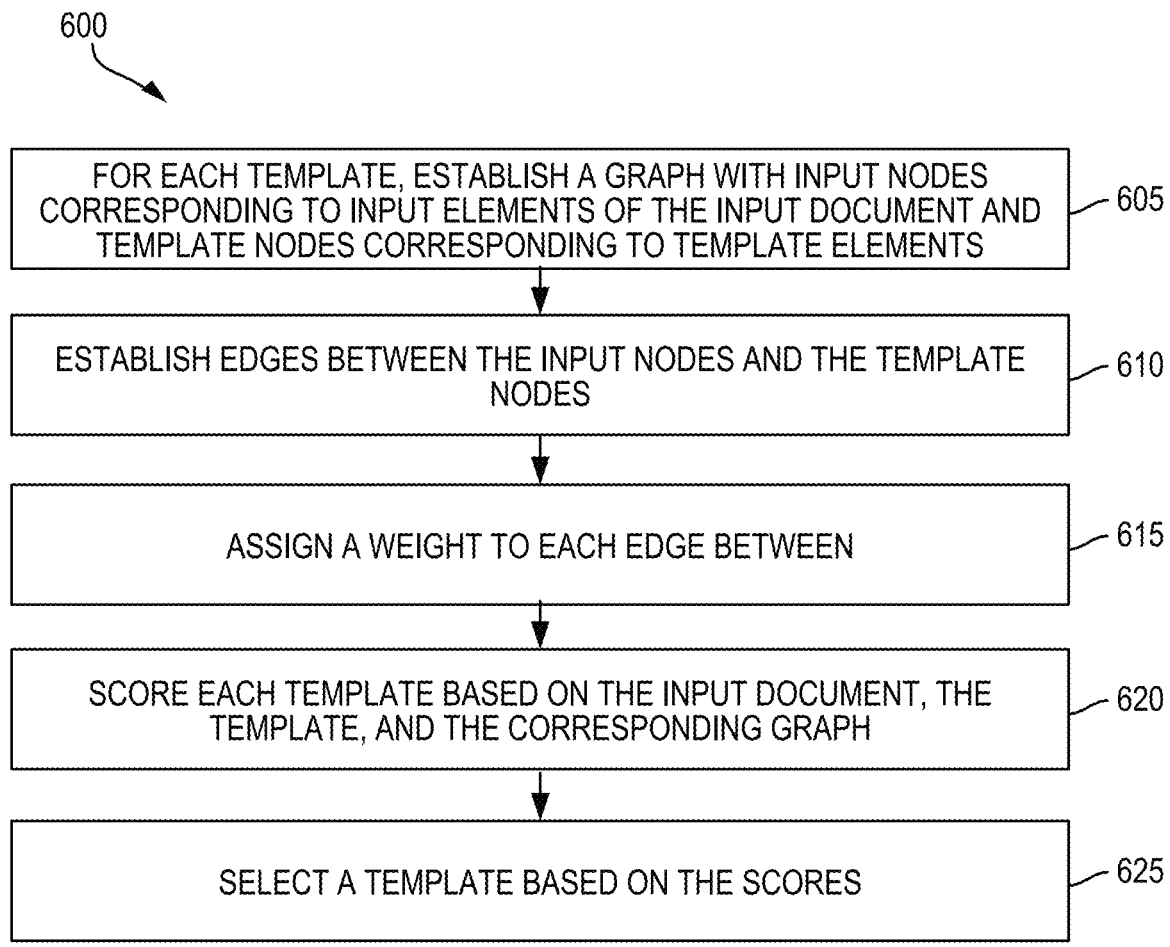
FIG. 6 is an example of a process for selecting a template from the available templates, according to some embodiments described herein.

FIG. 6 is an example of a process 600 for selecting a template 135 from the available templates 135, according to some embodiments described herein. An embodiment of the design system 100, specifically an embodiment of the template selection subsystem 160, performs this process 600 or similar at block 215 of the above process 200 for redesigning an input document 105. Generally, an example of this process 600 includes two phases for each available template. These phases include a first phase in which the template selection subsystem 160 generates a graph to describe similarity, or compatibility, between the input document 105 and the template 135 and a second phase in which the template selection subsystem 160 scores the graph. As described below, the template selection subsystem 160 then selects a template 135 based on the resulting scores of the available templates 135.

The process 600 depicted in FIG. 6, as well as other processes described herein, may be implemented in software executed by one or more processing units, in hardware, or in a combination software and hardware. This process 600 is intended to be illustrative and non-limiting. Although FIG. 6 depicts various activities occurring in a particular sequence or order, this is not intended to be limiting. In certain embodiments, for instance, the activities may be performed in a different order, activities may be added or omitted, or one or more activities of the process 600 may be performed in parallel.

As shown in FIG. 6, at block 605, the process 600 involves, for each available template 135, establishing nodes of a graph, where those nodes include a set of input nodes and a set of template nodes. Various techniques can be used to construct the graph. For instance, each node can be implemented as a data structure instance that includes one or more links to other data structure instances representing other nodes. In some embodiments, each input node represents an input element of the input document 105, and each template node represents a template element of the template 135.

At block 610, the process 600 involves, for each available template 135, establishing an edge between each input node and each template node of the respective graph for that template 135. In other words, in some embodiments, each input node is connected to each template node by a respective edge, and analogously, each template node is connected to each input node by a respective edge. Input nodes need not be connected to one another by edges, and template nodes need not be connected to one another by edges.

At block 615, the process 600 involves assigning a weight to each edge between a respective input node and a respective template node, where that weight represents a similarity between the pair of the input element represented by the input node and the template element represented by the template node. Various techniques may be used to compute this weight for each edge and, thus, for each pair.

In some embodiments, the template selection subsystem 160 classifies each edge into a corresponding category and assigns the edge a score corresponding to that category. In one example, the template selection subsystem 160 may use four categories, with each category representing a different level of similarity. The template selection subsystem 160 classifies an edge, and thus a similarity between the corresponding input element and template element, as belonging to a first category (1) if each of the input element and the template element is the only figure in its respective document (i.e., the input document 105 or the template 135) or (2) if the input element and the template element have similar positions and dimensions and the same element type. When an edge between an input node and a template node representing, respectively, an input element and a template element falls into the first category, that edge is assigned a first score. The template selection subsystem 160 classifies an edge, and thus a similarity between the corresponding input element and template element, as belonging to a second category (1) if the input element and the template element have similar positions, similar breadth or width, and the same element type or (2) if the first element and the second element differ in positions or element types but have similar dimensions. When an edge between an input node and a template node representing, respectively, an input element and a template element falls into the second category, that edge is assigned a second score. The template selection subsystem 160 classifies an edge, and thus a similarity between the corresponding input element and template element, as belonging to a third category (1) if the input element and the template element have similar positions of bounding shapes 310 and similar breadth or width of bounding shapes 310 but different element types; (2) if the input element and the template element have different positions, the same element types, and a subset relation (i.e., one is a partitioned part of the other, such as a case where split paragraphs formed from splitting a paragraph across a document are partitioned parts of the initial paragraph that has been split); or (3) the input element and the template element have different positions and different dimensions, but have similar bounding shape areas (i.e., the area within the corresponding bounding shapes 310). When an edge between an input node and a template node representing, respectively, an input element and a template element falls into the third category, that edge is assigned a third score. The template selection subsystem 160 classifies an edge, and thus a similarity between the corresponding input element and template element, as belonging to a fourth category if the input element and the template element have different positions and different element types but have a subset relation. When an edge between an input node and a template node representing, respectively, an input element and a template element falls into the fourth category, that edge is assigned a fourth score.

In the above example, a pair in the first category is deemed to have higher similarity than a pair in the second category, which is deemed to have higher similarity than a pair in the third category, which is deemed to have a higher similarity than a pair in the fourth category. As such, the first score is higher than the second score, which is higher than the third score, which is higher than the fourth score. The above is an illustrative example and not meant to be limiting. Various relationships between elements can be defined, and various categories can be assigned for scoring, or other scoring techniques may be used.

Generally, in some embodiments, when the input elements of an input document 105 are similar to the template elements of a template 135, various edges in the graph will have high scores, indicating a similarity between the input document and the template 135. Analogously, if the input document 105 and the template 135 are generally dissimilar, the edges will be assigned lower scores. When an input document 105 is similar to, and thus compatible with, a template, then the template represents a good candidate for use in redesigning the input document 105. In contrast, when an input document 105 is dissimilar from a template 135, it could be difficult to represent the content of the input document 105 in the layout of the template, and doing so could possible result in content loss, loss of reading order, or other issues.

At block 620, the process 600 involves scoring each templates based on the input document 105, the template 135, and the graph constructed at blocks 605-615 to represent the similarity between the input document 105 and the template 135. Various techniques can be used to score a template. In one example, the following scoring formula S(I, T, G) is used to compute the score for a template T with respect to an input document I given a similarity graph G describing similarities of elements between the two:

$$S(I,T,G) = f_{graph}(I,T,G) - f_{area}(I,T) - f_{type}(I,T)$$

In the above, the following definitions are used:

$$f_{graph}(I, T, G) = \frac{\text{sum}(G)}{\sqrt{nElements(I) * nElements(T)}}$$

$$\text{sum}(G) = \text{sum of all weights of edges}$$

$$f_{area}(I, T) = \alpha |contentArea(I) - contentArea(T)|$$

$$f_{type}(I, T) = \sum_{t \in Types} f_t(I, T) \text{ where}$$

$$f_t(I, T) =$$

-continued $$\begin{cases} 0 & \text{if } netType(I, t) = netType(T, t) \\ \beta_t |netType(I, t) - netType(T, t)| & \text{if either} = 0 \\ \gamma_t |netType(I, t) - netType(T, t)| & \text{otherwise} \end{cases}$$

Further, in the above, nElements( ) returns the total number of elements in the document being acted on, contentArea( ) returns the total area of the certain elements (e.g., text block elements), and netType( ) returns the total number of elements of a certain type t in the document being acted upon. In some embodiments, the parameters α, $\beta_t$, and $\gamma_t$ are predefined, manually or otherwise. For example, α=40/(10*128*128), $\beta_t$=0.5 or 1, and $\gamma_t$=0.5 or 1, but other implementations are possible and are within the scope of this disclosure.

At block 625, the process 600 involves selecting a template 135 from among the available templates 135, based on the scores computed at block 620. In some embodiments, the template selection subsystem 160 automatically selects a template 135, such as the template with the highest score. Additionally or alternatively, however, the template selection subsystem 160 may provide the user with a set of templates that received high scores (e.g., the highest scores), and the template selection subsystem 160 may receive from the user a selection of a template 135 from among those provided. In that case, an embodiment of the template selection subsystem 160 then selects the template 135 indicated by the user.

Example of Applying a Selected Template

As mentioned above, the design system 100 uses a GAN 175 to apply the selected template 135. An embodiment of the GAN 175 interpolates between the input layout image and the template layout image for the selected template. More specifically, a generator of the GAN 175 performs the interpolation. Prior to the GAN 175 performing such an interpolation, however, an embodiment of the training subsystem 130 trains the GAN 175 to perform such interpolations.

Figure 7:
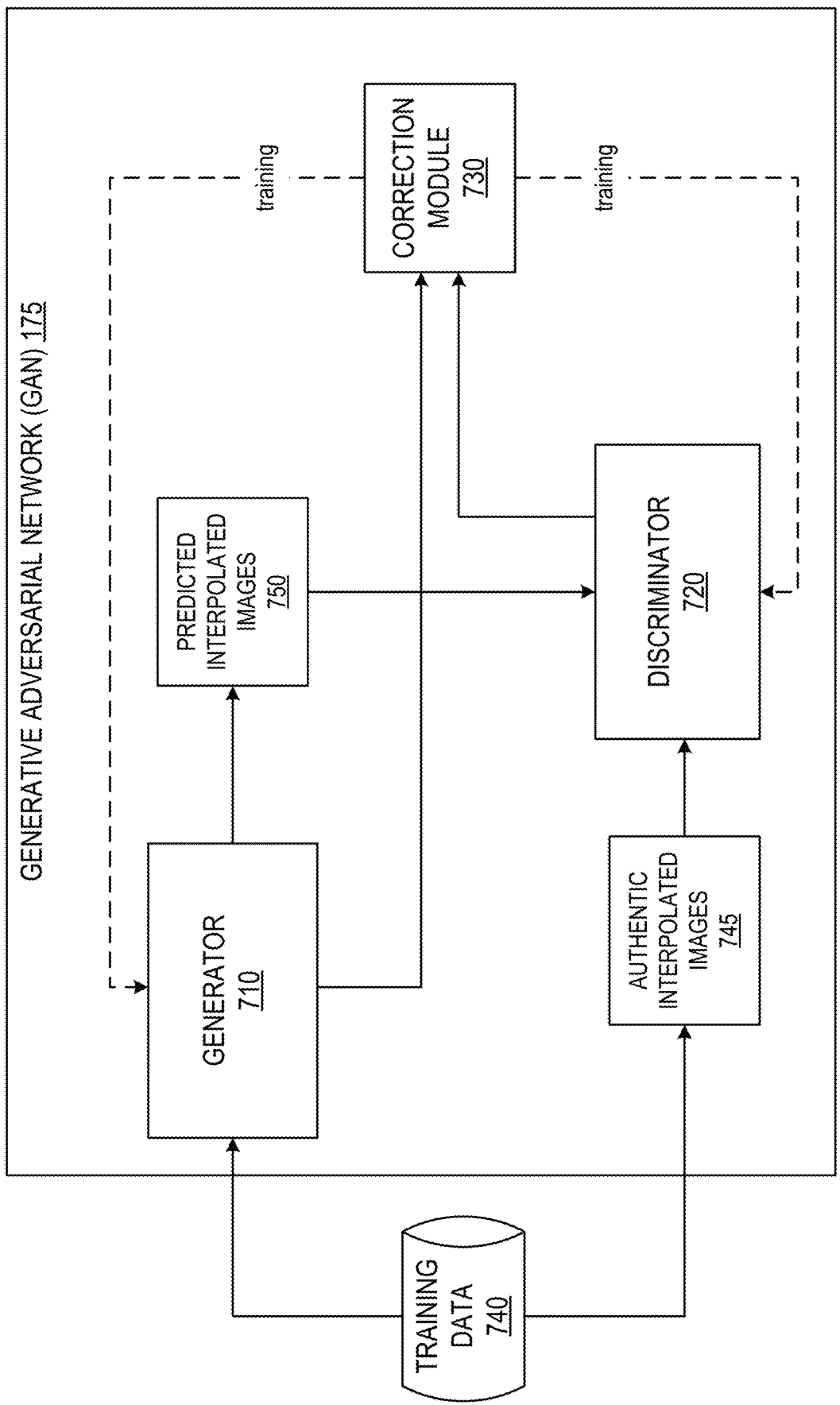
FIG. 7 is a diagram of a workflow of training a generative adversarial network (GAN) to interpolate between an input layout image of the input document and a template layout image of the selected template as part of applying the selected template to the input document, according to some embodiments described herein.

FIG. 7 is a diagram of a workflow of training the GAN 175 to interpolate between an input image and an output image, specifically the input layout image of the input document 105 and a template layout image of the selected template 135, according to some embodiments described herein. In some embodiments, this training occurs as part of initialization of the design system 100 and need occur only once or as needed to refine the GAN 175. Specifically, this training occurs prior to block 225 of the process 200 for redesigning an input document 105.

As shown in FIG. 7, the GAN 175 includes a generator 710, a discriminator 720, and a correction module 730. Each of the generator 710, the discriminator 720, and the correction module 730 may be implemented as hardware, software, or a combination of both. Each of the generator 710 and the discriminator 720 may be a respective prediction model, such as a respective neural network. In some embodiments, the training subsystem 130 trains the generator 710 to perform interpolations and trains the discriminator to recognize authentic interpolations, such that the generator 710 and the discriminator 720 take on adversarial roles to enable both to improve.

In some embodiments, the training subsystem 130 trains the GAN 175, specifically the generator 710 and the discriminator 720, in cycles. Each cycle includes training the generator 710 while the discriminator 720 is fixed (i.e., unchanged) and then training the discriminator 720 while the generator 710 is fixed, or each cycle includes training the generator 710 while the discriminator 720 is fixed and then training the discriminator 720 while the generator 710 is fixed. During each cycle, the training subsystem 130 inputs into the generator 710 training tuples of data. Each training tuple is selected from a set of training data 740 and includes an input image, an output image, a direction, and a polarity. Each tuple is associated with an authentic interpolated image 745, which is the desired result of interpolating between the input image and the output image given the indicated direction and polarity.

Based on the input of a training tuple, an embodiment of the generator 710 generates a predicted interpolated image 750, which is prediction of an interpolation between the input image and the output layout image given the direction and polarity parameters provided. Alongside that, the training subsystem 130 provides as input to the discriminator 720 the predicted interpolated images 750 generated by the generator 710 as well as authentic interpolated images 745 selected from the training data 740. The discriminator 720 then predicts whether each interpolated image received is authentic. While the discriminator 720 is fixed, the correction module 730 updates the weights of the neural network of the generator 710 based on the level of accuracy of the predicted interpolated image 750 (i.e., how closely the predicted interpolated image 750 matches the authentic interpolated image 745 corresponding to the training tuple on which the predicted image was based) and further based on the discriminator's output. While the generator 710 is fixed, the correction module 730 updates the weights of the neural network of the discriminator 720 based on the level of accuracy of the discriminator's predictions of authenticity.

In some embodiments, the training subsystem 130 uses training data 740 that is generated from the available templates 135, or from other templates. In other words, each training tuple and each authentic interpolated image 745 was created, manually or via an automated process, from the available templates 135. The result of training the GAN 175, in the manner above or otherwise, is that the GAN 175, specifically the generator 710 of the GAN 175, is useable to interpolate between an input layout image and a template layout image as described herein.

Figure 8:
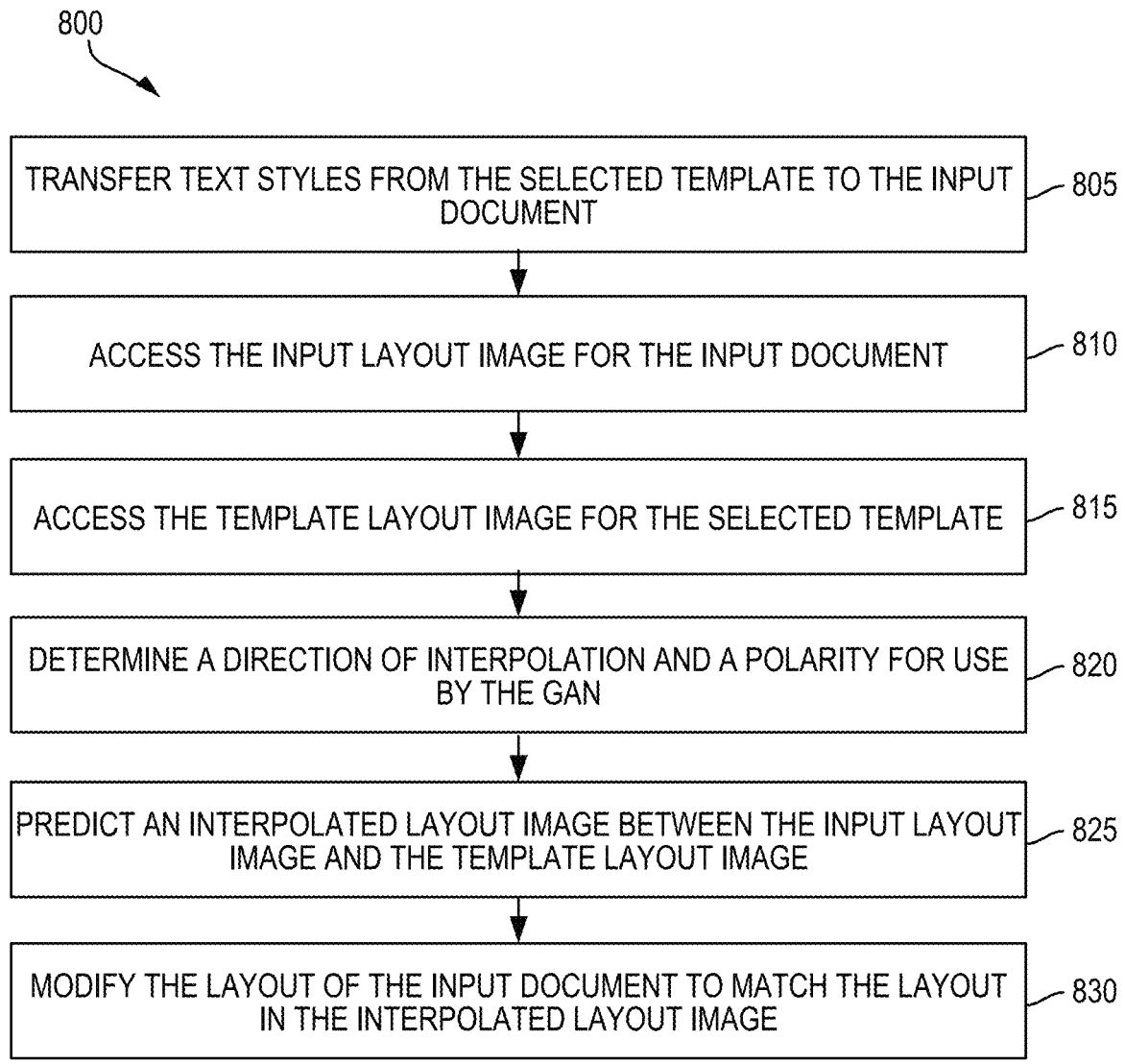
FIG. 8 is a diagram of an example of a process of applying the selected template, in part through the use of the GAN, according to come embodiments described herein.

FIG. 8 is a diagram of an example of a process 800 of applying a selected template 135, in part through the use of the GAN 175, according to some embodiments described herein. In some embodiments, the template application subsystem 170 performs this process 800 or similar, at block 225 of the above process 200 for redesigning an input document 105. Upon performance of this process 800, the GAN 175 has already been trained to perform interpolations between images.

The process 800 depicted in FIG. 8, as well as other processes described herein, may be implemented in software executed by one or more processing units, in hardware, or in a combination software and hardware. This process 800 is intended to be illustrative and non-limiting. Although FIG. 8 depicts various activities occurring in a particular sequence or order, this is not intended to be limiting. In certain embodiments, for instance, the activities may be performed in a different order, activities may be added or omitted, or one or more activities of the process 800 may be performed in parallel.

At block 805, the process 800 involves transferring text styles from the selected template 135 to the input document 105. In some embodiments, the text style information considered includes font properties and color properties. For example, font properties include font size, font family, alignment, font color, and font styling (e.g., bold, italics, font weight), and color properties include background colors. In one example, the background color for a text block element is defined as the color of the graphic rectangle of a majority of the bounding shape 310 of the text block element.

In some embodiments, the template application subsystem 170 modifies the marked-up document 109 (e.g., the HTML version) representing the input document 105, so as to indicate the text styles from the selected template 135. For instance, the template application subsystem 170 extracts information about text styles, along with associated unique identifiers (e.g., serial numbers), from the styles JSON document or the template common document for the selected template 135. The template application subsystem 170 then modifies the definitions of classes used in the marked-up document 109 to match the text styles of the selected template 135. Modified classes may include, for example, classes defining heading styles (e.g., h1, h2, h3, h4, and h5 in an HTML document) or other styles in the marked-up document 109.

At block 810, the process 800 involves accessing the input layout image representing the input document 105. As described above, the document preprocessing subsystem previously generated in the input layout image. At block 815, the process 800 involves accessing the template layout image representing the selected template. As described above, the template preprocessing subsystem 120 previously generated the template layout image of the selected template 135.

At block 820, the process 800 involves determining a direction of interpolation and a polarity to provide as input to the GAN 175 to enable the GAN 175 to interpolate between the input layout image and the template layout image. In some embodiments, the GAN 175 can utilize one of a total of 120 possible directions and one of two polarities to generate an interpolated image given two images, specifically the input layout image and the template layout image. Generally, the polarity indicates which provided image (i.e., the input layout image or the template layout image) is considered the first image, or the input image, and which is considered the second image, or output image. The direction of interpolation provides further guidance as to how the GAN 175 should interpolate between the two provided images. Specifically, an example of a direction of interpolation is a permutation of five different element types (e.g., paragraph, list, heading, image, and table).

In some embodiments described herein, to remove redundancy and to identify a suitable interpolated layout image between the input layout image and the template layout image, the template application subsystem 170 applies a direction-finding heuristic. To execute the direction-finding heuristic, the template application subsystem 170 takes as input the input layout image and the template layout image, and using the direction-finding heuristic, the template application subsystem 170 determines a direction-polarity pair (i.e., a direction and a polarity) that are appropriate for use in the interpolation.

Some embodiments of the template application subsystem 170 utilize a direction-finding heuristic as described below. In this example, a set of element types in the input document I is $types_{inp}$, the set of element types in the selected template T is $types_{out}$, sortByArea is a function that generates a list of elements that are ordered according to the elements' respective areas, reverse is a function that is applied to an ordered list of elements and thereby generates a list of the elements with the order reversed, and shuffle is a function that is applied to an ordered list of elements and thereby generates a different list having a random permutation in the order of the elements.

$types_{overall} = \cup_{t \in Types} t$ $types_{union} = types_{inp} \cup types_{out}$ $types_{np} = types_{overall} \setminus types_{union}$ $delta_{io} = types_{inp} \setminus types_{out}$ $delta_{oi} = types_{out} \setminus types_{inp}$ $types_{both} = types_{inp} \cap types_{out}$ $types_{area} = sortByArea(types_{union})$ $types_{rev} = reverse(types_{area})$ $types_{inter} = sortByArea(type_{both})$ $types_{rand} = shuffle(types_{overall})$ In the below example definition of the direction-finding heuristic, polarity from the input image to the output image (e.g., from the input layout image to the template layout image) is denoted $pol_{io}$; and polarity from the output image to the input image is denoted as $pol_{oi}$.

If $types_{inp} \approx types_{out}$:
  The first <direction, polarity> pair is: <$types_{np}$+$types_{area}$, $pol_{oi}$>
  The second pair is: <$types_{np}$+$types_{rev}$, $pol_{oi}$>
  The optional third pair has either of the above two directions with the polarity $pol_{io}$
Otherwise:
  The first pair is: <$delta_{io}$+$delta_{oi}$+$types_{inter}$+$types_{np}$, $pol_{oi}$>
  The second pair is: <$delta_{oi}$+$delta_{io}$+$types_{inter}$+$types_{np}$, $pol_{oi}$>
  The optional third pair is: <$types_{rand}$, $pol_{io}$>

The following example involves the structure and result of experimentation that can be used for construction of the direction-finding heuristic. This example involved a set of five generated images for a given polarity and five intermediate layouts available for user selection. In this example, the fifth interpolated image in the set of five generated is the same as the output image (e.g., the template layout image in this case). When the polarity is from the output image to the input image, the resulting interpolated images obtained are more similar in appearance to the input image than to the output image (e.g., position and dimensions of the boxes in the interpolated images are more similar to the input image than the output image). The interpolated image corresponding to the item in the input direction list, which will not be present in any of the two layout images, would just be the same as the interpolated image corresponding to a previous direction item (i.e., acts as an identity map). For instance, the interpolation operation receives, a set of class-level attributes as parameters. If an element is not present in both layout images, there is no change in interpolation output.

At block 825, the process 800 involves predicting an interpolated layout image. In some embodiments, this block 825 of the process 800 can be used to implement a step for applying the GAN to predict an interpolated layout image from the input layout image and the template layout image. In some embodiments, if multiple direction-polarity pairs were selected at block 820, then the template application subsystem 170 inputs each such pair individually into the GAN 175. Based on the input layout image, the template layout image, and each pair of a direction and a polarity, the GAN 175 predicts a respective interpolated layout image. Thus, the GAN 175 predicts a quantity of interpolated layout images equal to the quantity of direction-polarity pairs determined above. In some embodiments, the template application subsystem 170 selects one of such interpolated layout images as the one to be used; for instance, the one deemed most like the input layout image may be selected. Additionally or alternatively, however, the template application subsystem 170 presents the interpolated layout images to the user to enable the user to select one, and then the template application subsystem 170 selects the one indicated by the user.

At block 830, the process 800 involves modifying the layout of the input document 105 to correspond to the interpolated layout image generated and selected at block 825. In some embodiments, this block 830 of the process 800 can be used to implement a step for generating an output document 155 by modifying a layout of the input document 105 to match the interpolated layout image In some embodiments, to this end, the template application subsystem 170 determines matchings between the bounding shapes 310 representing input elements in the input layout image, referred to as input bounding shapes 310, and the bounding shapes 310 in the interpolated layout image, referred to as interpolated bounding shapes 310.

As described above with respect to FIG. 3, each layout image 300 includes a set of bounding shapes 310, and each bounding shape 310 is colored according to the element type being represented. The color of a bounding shape 310 thus acts as a tag for the element type being represented. In some embodiments, the template application subsystem 170 selects each input element in turn and seeks a matching interpolated bounding shape 310. Upon identifying a match, the template application subsystem 170 may modify the input element to more closely match the interpolated bounding shape 310. For instance, the template application subsystem 170 makes such modifications in the marked-up document 109, and the marked-up document 109 is later used to generate the output document 155.

In one example, the template application subsystem 170 recognizes one-to-one matching with the same tags and, potentially in limited cases, one-to-one matching with different tags. A one-to-one matching with the same tag (i.e., with the same element type as determined by the color of interpolated bounding shape 310) is the simplest case and can be applied to each element type of the input elements as needed. When such a match is identified, only the coordinates of the input bounding shape 310 are updated to correspond to the coordinates of the matching interpolated bounding shape 310 in the interpolated layout image.

In some embodiments, the template application subsystem 170 recognizes a one-to-one matching with different tags only when the different tags correspond to different types of text blocks. For instance, both the input element and the interpolated bounding shape 310 represent different element types from the set of heading, paragraph, and list. In some embodiments, tables and images cannot be matched to different categories, so this type of matching does not apply to a tables or images. In the case of this type of matching, the template application subsystem 170 updates the coordinates of the input bounding shape 310 of the input element to match the coordinates of the interpolated bounding shape 310 deemed to match, and the input element is converted to the element type of the interpolated bounding shape 310 as indicated by the color of the interpolated bounding shape. For instance, to convert a paragraph to list, the template application subsystem 170 splits the paragraph into smaller blocks that become lists entries. Various techniques exist to logically divide paragraphs into parts, and one or more of such techniques may be used. To convert a list to a paragraph, the template application subsystem 170 concatenates the various list entries into a paragraph based on their reading order. If no match is found for an input element, the input element is merged with a similar input element.

After this interpolation and matching, the input document 105 (e.g., in the form of the marked-up document 109) has now been redesigned in terms of text styles or layout, or both, based on the selected template 135. However, as described below, some embodiments of the design system 100 make additional modifications related to text styles to further customize the input document 105 before returning an output.

Example of Generating and Output Document

Figure 9:
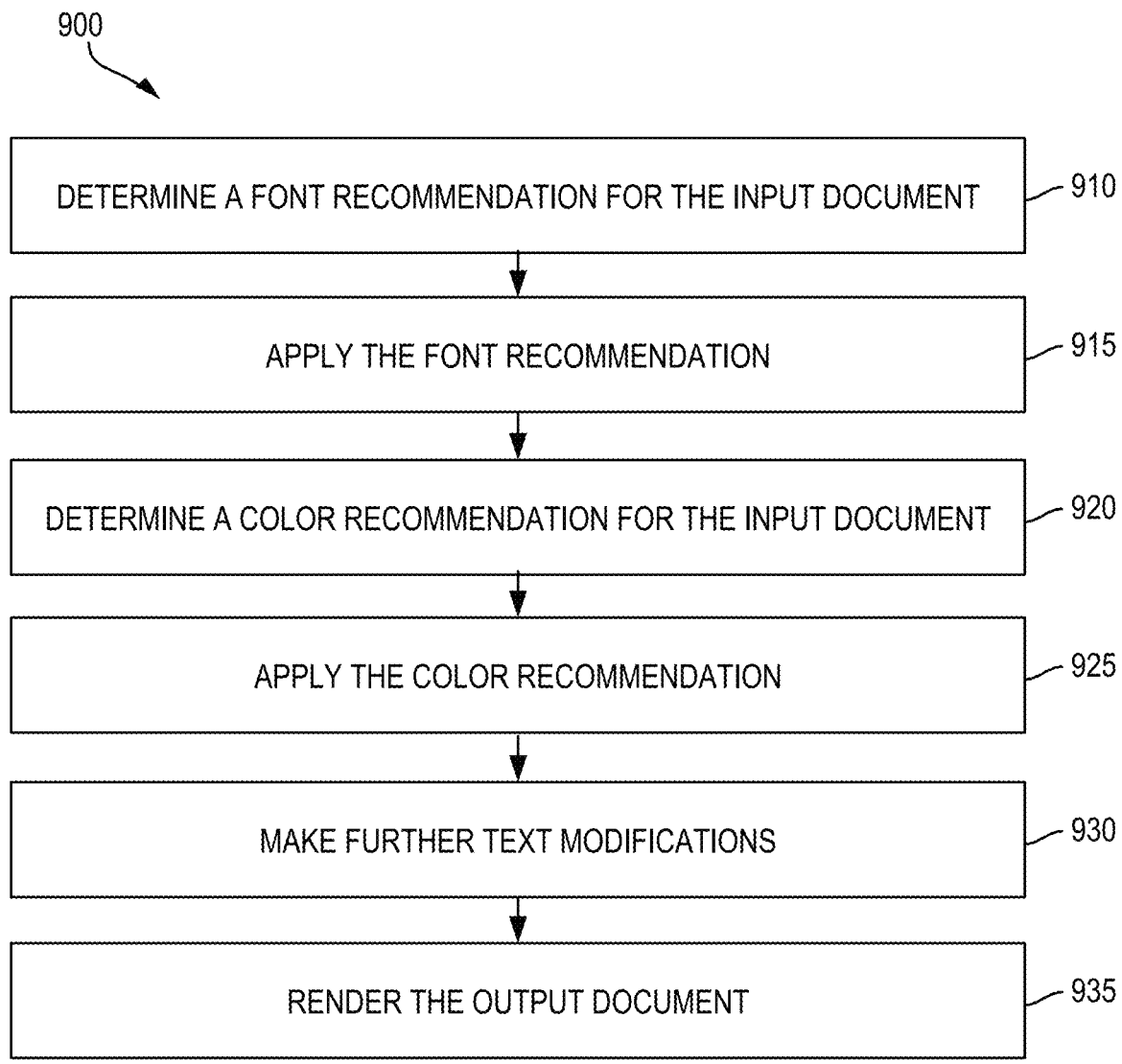
FIG. 9 is a diagram of an example of a process for generating an output document, according to some embodiments described herein.

FIG. 9 is a diagram of an example of a process 900 for generating an output document 155, according to some embodiments described herein. In some embodiments, the document generator 190 performs this process 900 or similar at block 235 of the process 200 for redesigning an input document 105. In other words, an embodiment of this process 900 is performed after execution of the above process 800 of applying the selected template 135. Thus, at this point, the input document 105 has already been modified with respect to text styles or layout, or both, based on an interpolated layout image determined from a selected template 135. As such, the current version of the input document 105, as modified, is referred to below as the updated input document 105.

The process 900 depicted in FIG. 9, as well as other processes described herein, may be implemented in software executed by one or more processing units, in hardware, or in a combination software and hardware. This process 900 is intended to be illustrative and non-limiting. Although FIG. 9 depicts various activities occurring in a particular sequence or order, this is not intended to be limiting. In certain embodiments, for instance, the activities may be performed in a different order, activities may be added or omitted, or one or more activities of the process 900 may be performed in parallel.

At block 910, the document generator 190 determines a font recommendation for modifying one or more fonts in the updated input document 105. Specifically, the font recommendation may be the recommendation of a font palette including a respective font for each text block element in the updated input document 105. Although fonts may have already been modified through application of the template, providing a further font recommendation can further customize the input document 105. In some embodiments, the font recommendation is based on various factors, such as associations between visual attributes of fonts and the verbal context of text block elements (e.g., text based features generated by one or more models listed in the following paragraph) in the updated input document 105. As a result, the font recommendation is based on the textual content of the updated input document 105 and, thus, of the input document 105.

In some embodiments, the document generator 190 establishes associations between visual attributes of fonts and verbal contexts of text block elements. 2 by using the Bidirectional Encoder Representations from Transformers (BERT) Sequence Classification Model, also referred to as the BERT model, or by using some other model, such as the Global Vectors for Word Representation ("GloVe") Bidirectional Long Short-Term Memory (BiLSTM) Model, the NRC Model, or the Deep-Moji Pretrained Model. The document generator 190 may use the model (e.g., the BERT model) to score each font type in a set of available font types (e.g., ten selected font types). Some drawbacks of the BERT model are that it is dependent on crowd-sourced data for learning labelled distributions and capturing inter-subjectivity across all annotations, and the scores generated by the BERT model are dependent on the verbal context of text block elements.

In some embodiments, the document generator 190 applies the BERT model, or another model, to various available fonts with respect to each text block element of the input elements. To overcome the above limitations, the document generator 190 provides further optimizations to the BERT model by, for each text block element, comparing font properties of a selected font (e.g., the highest-scoring font according to the BERT model) to a font dataset, which may include tens, hundreds, or thousands of fonts. For instance, the font dataset is curated from the Google Fonts repository. In one example, the document generator 190 compares the selected font to each font in the font dataset on the basis of one or more of the following metrics: font size similarity, letter spacing similarity, word spacing, and relative font size.

For example, font size similarity is the ratio of average size similarity of the selected font $f_1$ and another font $f_2$, from the font dataset. Font size similarity can be calculated as:

$$SizeSimilarity(f_1, f_2) = \frac{\sum similarity(f_1, f_2) * weight(f_1, f_2, symbol)}{\sum weight(f_1, f_2, symbol)}$$

where $$weight(f_1, f_2, symbol) = letterFrequency(symbol)$$

$$similarity(f_1, f_2) = \min\left(\frac{FW(f_1)}{FW(f_2)}, \frac{FW(f_2)}{FW(f_1)}\right)$$

and where FW( ) is the font width of a font, a symbol is a letter of the alphabet represented in the fonts, and letterFrequency( ) is the frequency of a symbol in the input element being considered.

In some embodiments, the letter spacing of a font is defined as the ratio between the difference between font width per spaces and the font size. For example, the letter spacing between the selected font $f_1$ and another font $f_2$, from the font dataset, is calculated as:

$$LS(f_1, f_2) = \frac{FW(f_1) - FW(f_2)}{spaces * Fsize(f_2)}$$

where Fsize( ) is font size and spaces=text.length−1, where text.length is the length of the input element being considered (i.e., the text block element for which the selected font $f_1$ was initially selected).

In some embodiments, the word spacing for a pair of fonts $f_2$ and $f_2$ is defined as the relative difference between (a) the difference of font width per font size of the font and (b) twice the spacing between character elements when the font is displayed. A difference of font width per font size of a given font could be, for instance, an amount by which the font width for the given font increases each time the font size for the given font is incremented (or vice versa). In one example, a similarity between word spacing is calculated as follows:

$$WS(f_1, f_2) = \frac{FD(f_1) - FD(f_2)}{Fsize(f_2)} - 2 * LS(f_1, f_2)$$

where FD( ) denotes difference in the font sizes.

Further, in some embodiments, relative font size is defined as the ratio of the font heights of the two fonts. Relative font size can be defined as follows:

$$HS(f_1, f_2) = \frac{FH(f_1)}{FH(f_2)}$$

where FH( ) denotes font height.

In some embodiments, after respective similarity scores are generated for each of the above metrics, or for one or more additional or alternative metrics, the document generator 190 creates a font cluster for each input element. The document generator 190 then represents each font cluster as a point set (e.g., a single point), which has a fewer number of points than in the full font cluster. For instance, the document generator selects (e.g., randomly) a point or multiple points from each cluster to act as the point set, where that point set represents fonts to be recommended or used for the input element associated with the font cluster. In some embodiments, only these representative point sets from clusters rather than all points in the font cluster are used for similarity comparisons, which allows for a similarity comparison to be performed using fewer computational resources than would be the case if a similarity comparison was performed with an entire set of points in each font cluster. The document generator 190 generates a font palette that includes the selected font, or fonts, for each input element.

At block 915, if applicable, the process 900 involves applying the font recommendation to modify font properties (e.g., font family, font size, font styling) of the various input elements. In some embodiments, the document generator 190 automatically applies the font palette without querying a user. In other embodiments, however, the document generator 190 prompts a user to approve or reject the font palette, and in that case, the document generator applies the font palette if the user approves. Applying the font palette may include further modifying the marked-up document 109 to indicate, for each input element that is a text block, a respective font from the font palette. The respective font can include one or more multiple font properties.

At block 920, the document generator 190 determines a color recommendation for modifying one or more colors in the updated input document 105. In some embodiments, the document generator 190 determines a color recommendation based on the content of the input document 105, specifically the updated input document 105, using the Text2Color model. The document generator 190 does so while simultaneously preserving the styles of the template 135, such as background colors:

In some embodiments, the document generator extracts all text from the input document 105, such as by extracting the text from the common document, maintaining the element type for each text block during extraction. The document generator 190 performs keyword extraction on each text block, such as by using the Yake python package to obtain a top set of keywords for each text block. Based on the keywords, the document generator 190 uses the Text2Color model to obtain a set of colors (e.g., ten colors) for each element type.

The Text2Color model has two networks, which include a Text-to-Palette Generation (TPN) network and a Palette-based Colorization (PCN) network, each of which is implemented as a conditional GAN. The TPN network takes text as input and generates a color palette, and the PCN network takes a color palette and an image as input and generates a colored image. In some embodiments, the document generator 190 used a TPN network from the Text2Color model, where the TPN network was trained on the Palette-and-Text dataset.

Some difficulties in readability might result from directly applying a determined color palette. Thus, in some embodiments, the document generator implements a filtering technique on an obtained color palette according to the background colors already applied from the template 135. For instance, the document generator 190 calculates a contrast ratio for each color in the color palette against the background color for the corresponding element type as applied from the template 135 to the updated input document 105. The contrast ratio can be calculated as follows:

$$\text{ratio}(c_1, c_2) = \frac{L(c_1) + 0.05}{L(c_2) + 0.05}$$

where $c_1$ is the font color, $c_2$ is the background color, and $L(c_1)$ and $L(c_2)$ are their respective luminances. Luminance of a color c can be computed as follows:

$$L(c) = 0.2126 * \text{func}(r) + 0.7152 * \text{func}(g) + 0.0722 * \text{func}(g)$$

where r, g, and b are the normalized red-green-blue (RGB) color codes of the color c. In one example, the function func( ) is implemented as follows, where x represents an RGB color code:

$$\text{func}(x) = \begin{cases} \frac{x}{12.92} & \text{if, } x < 0.03 \\ \left(\frac{x + 0.055}{1.055}\right)^{24} & \text{otherwise} \end{cases}$$

After calculating the contrast ratio for each color against the corresponding background color, the document generator 190 selects one or more colors per element type. For example, the selected colors for an element type are the colors with the highest contrast ratios.

At block 925, if applicable, the process 900 involves applying a color palette to modify color properties of the input elements. In some embodiments, the document generator 190 automatically applies to each element type the color determined at block 920 to have the highest contrast ratio. In other embodiments, however, the document generator 190 prompts a user to select from among the one or more colors determined for each element type. In that case, the document generator 190 applies the colors selected by the user. Applying the colors may include further modifying the marked-up document 109 to indicate, for each input element that is a text block, the color selected for the applicable element type.

At block 930, the document generator 190 may modify the text via text simplification, text style transfer, or some other technique. In some embodiments, to perform text simplification, the document generator 190 uses Access framework, which uses three control tokens to determine a final simplified text for each input element. In one example, the values of the control tokens are manually predefined to obtain an appropriate level of simplification without loss of meaning or significance. To perform a text style transfer, an embodiment of the document generator 190 uses one or more existing models for formalizing and in-formalizing to increase or decrease excitement. Furthermore, an example of text style transfer includes modifying a text sentence to increase or decrease a tone or sentiment associated with the sentence, such as by increasing characteristics like excitement, formality, etc. in the sentence. For instance, an initial sentence such as "Can you come in?" could be modified to increase formality and thereby obtain a modified sentence such as "May you come in please?" Control tokens are some chosen word features in the sentence to change the tone or sentiment in a sentence.

At block 935, the document generator 190 renders the output document 155. In some embodiments, for instance, the document generator renders the marked-up document 109, which has been modified as described above, and converts the resulting one or more pages into PDF or some other format for the output document 155.

Example of a Computing System for Executing a Design System

Figure 10:
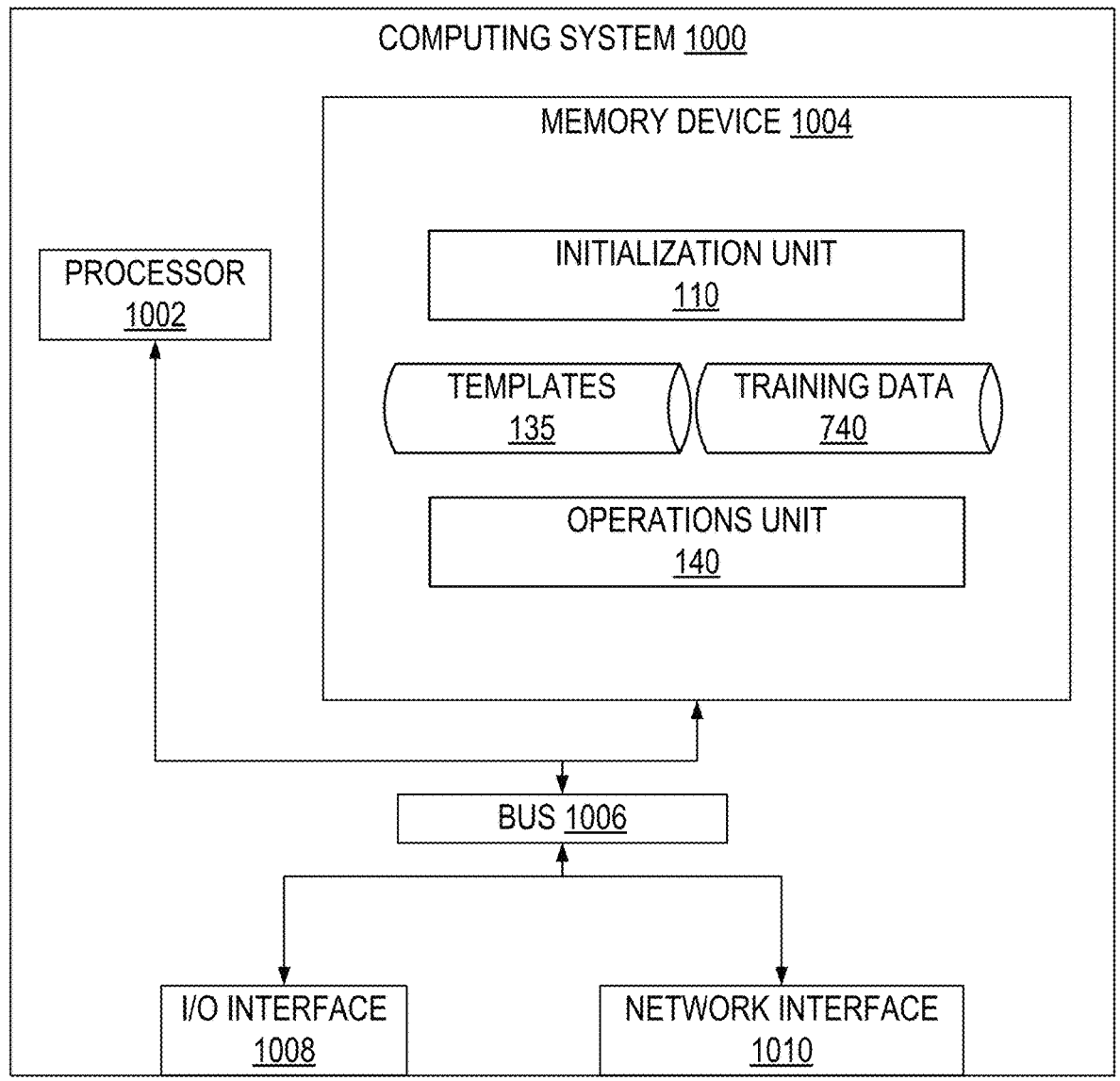
FIG. 10 is a diagram of an example of a computing system that performs certain operations described herein, according to some embodiments described herein.

Any suitable computing system or group of computing systems can be used for performing the operations described herein. For example, FIG. 10 depicts an example of a computing system 1000 that executes a design system 100. In some embodiments, the computing system 1000 executes both the initialization unit 110 and the operations unit 140, as depicted in FIG. 10. In other embodiments, a separate computing system having devices similar to those depicted in FIG. 10 (e.g., a processor, a memory, etc.) executes the initialization unit 110 or a portion thereof.

The depicted example of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as input or output devices. For example, the computing system 1000 is shown with one or more input/output ("I/O") interfaces 1008. An I/O interface 1008 can receive input from input devices or provide output to output devices. One or more buses 1006 are also included in the computing system 1000. The bus 1006 communicatively couples one or more components of a respective one of the computing system 1000.

The computing system 1000 executes program code that configures the processor 1002 to perform one or more of the operations described herein. The program code includes, for example, the initialization unit 110, the operations unit 140, or other suitable applications that perform one or more operations described herein. The program code may be resident in the memory device 1004 or any suitable computer-readable medium and may be executed by the processor 1002 or any other suitable processor. In some embodiments, both the training initialization unit 110 and the operations unit 140 are stored in the memory device 1004, as depicted in FIG. 10. In additional or alternative embodiments, one or more of initialization unit 110 and the operations unit 140 are stored in different memory devices of different computing systems. In additional or alternative embodiments, the program code described above is stored in one or more other memory devices accessible via a data network.

The computing system 1000 can access one or more of the training data 740 or the available templates 135 in any suitable manner. In some embodiments, some or all of data needed for the design system 100 are stored in the memory device 1004, as in the example depicted in FIG. 10. For another example, a computing system that executes the initialization unit 110 can provide access to the trained GAN 175 to enable execution of the operations unit 140.

The computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and the like. The computing system 1000 is able to communicate with one or more other computing devices (e.g., a computing device executing the initialization unit 110) via a data network using the network interface device 1010.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more devices perform operations comprising:

generating an input layout image representing an input document, wherein the input layout image comprises a representation of an input element of the input document, and wherein the input element is associated with a first tag describing the input element;

selecting a template for modifying the input document;

accessing a template layout image representing the template, wherein the template layout image comprises a representation of a template element of the template, and wherein the template element is associated with a second tag describing the template element;

using a prediction model trained in a generative adversarial network (GAN) to predict an interpolated layout image from the input layout image and the template layout image, wherein the interpolated layout image comprises a representation of an interpolated element associated with a third tag describing the interpolated element;

matching the input element to the interpolated element in the interpolated layout image predicted by the prediction model, based on a similarity between a shape of the input element as represented in the input layout image and a shape of the interpolated element as represented in the interpolated layout image and further based on a similarity between the third tag describing the interpolated element and the first tag describing the input element; and generating an output document by modifying a layout of the input document to match the interpolated layout image by fitting the input element into the shape of the interpolated element of the interpolated layout image, based on matching the input element to the third shape.

2. The method of claim 1, wherein the third tag is a color corresponding to an element type, and wherein matching the input element to the interpolated element based on the similarity between the shape of the input element and the shape of the interpolated element and between the third tag and the first tag comprises matching an input element type of the input element to the element type corresponding to the color.

3. The method of claim 1, the operations further comprising training the prediction model through the GAN to predict a layout image that is interpolated from a first layout image and a second layout image, wherein training the prediction model through the GAN comprises:
   accessing training tuples, wherein each training tuple of the training tuples comprises a respective first layout image representing a respective first document, a respective second layout image representing a respective second document, and a respective direction of interpolation, and wherein each training tuple is associated with a respective interpolated layout image; and
   training the prediction model using the training tuples, wherein, for each training tuple, the respective first layout image, the respective second layout image, and the respective direction of interpolation are used as training inputs, and the respective interpolated layout image is used as an expected output.

4. The method of claim 1, the operations further comprising:
   predicting a direction of interpolation from the input layout image and the template layout image,
   wherein the prediction model utilizes the direction of interpolation in computing the interpolated layout image from the input layout image and the template layout image.

5. The method of claim 1, wherein selecting the template comprises:
   generating a similarity graph comprising (a) input nodes representing input elements of the input document, (b) template nodes representing template elements of a template, and (b) edges connecting the input nodes to the templates nodes, wherein an edge between an input node representing the input element and a template node representing the template element has a similarity weight indicating a similarity between the input element and the template element;
   computing a score for the template based on the similarity graph; and
   selecting the template based on the score.

6. The method of claim 5, wherein the similarity weight of the edge between the input node and the template node is based on a similarity between the shape of the input element and a shape of the template element.

7. The method of claim 6, wherein the similarity weight of the edge between the input node and the template node is further based on a similarity between the first tag associated with the input element and the second tag associated with the template element.

8. The method of claim 7, wherein generating the input layout image comprises:
   adjusting the shape of the input element to avoid overlapping of the shape of the input element with another shape corresponding to another input element of the input document;
   adjusting a font size of the input element to fit within the shape of the input element as adjusted; and
   updating the font size in the first tag.

9. The method of claim 5, wherein computing the score for the template comprises:
   determining a first count of input elements in the input document and a second count of template elements in the template;
   computing a first content area size comprising area occupied by the input elements and a second content area size comprising area occupied by the template elements;
   determining respective types of the input elements and the template elements; and
   computing the score as a function of the first count, the second count, the first content area size, the second content area size, and the respective types of the input elements and the template elements.

10. The method of claim 1, wherein generating the input layout image comprises:
    adjusting the shape of the input element to avoid overlapping of the shape of the input element with another shape corresponding to another input element of the input document; and
    adjusting a font size of the input element to fit within the shape of the input element as adjusted.

11. A system for redesigning documents, the system comprising:
    a memory component; and
    a processing device coupled to the memory component, the processing device to perform operations comprising:
      generating an input layout image representing an input document, wherein the input layout image comprises a representation of an input element of the input document, and wherein the input element is associated with a first tag describing the input element;
      selecting a template for modifying the input document;
      accessing a template layout image representing the template, wherein the template layout image comprises a representation of a template element of the template, and wherein the template element is associated with a second tag describing the template element;
      use a prediction model trained in a generative adversarial network (GAN) to predict an interpolated layout image from the input layout image and the template layout image, wherein the interpolated layout image comprises a representation of an interpolated element associated with a third tag describing the interpolated element;
      matching the input element to the interpolated element in the interpolated layout image predicted by the prediction model, based on a similarity between a shape of the input element as represented in the input layout image and a shape of the interpolated element as represented in the interpolated layout image and further based on a similarity between the third tag describing the interpolated element and the first tag describing the input element; and
      generating an output document by modifying a layout of the input document to match the interpolated layout image by fitting the input element into the shape of the interpolated element of the interpolated layout image, based on matching the input element to the interpolated element.

12. The system of claim 11, wherein selecting the template comprises:
- generating a similarity graph comprising (a) input nodes representing input elements of the input document, (b) template nodes representing template elements of a template, and (b) edges connecting the input nodes to the templates nodes, wherein an edge between an input node representing the input element and a template node representing the template element has a similarity weight indicating a similarity between the input element and the template element;
- computing a score for the template based on the similarity graph; and
- selecting the template based on the score.

13. The system of claim 12, wherein the similarity weight of the edge between the input node and the template node is based on a similarity between the shape of the input element and the shape of the interpolated element and on a similarity between the first tag associated with the input element and the second tag associated with the template element.

14. The system of claim 12, wherein computing the score for the template comprises:
- determining a first count of input elements in the input document and a second count of template elements in the template;
- computing a first content area size comprising area occupied by the input elements and a second content area size comprising area occupied by the template elements;
- determining respective types of the input elements and the template elements; and
- computing the score as a function of the first count, the second count, the first content area size, the second content area size, and the respective types of the input elements and the template elements.

15. A non-transitory computer-readable medium embodying program code for redesigning documents, the program code comprising instructions that, when executed by a processor, cause the processor to perform operations comprising:
- selecting a template for modifying an input document, wherein selecting the template comprises:
  - generating a similarity graph comprising (a) input nodes representing input elements of the input document, (b) template nodes representing template elements of a template, and (b) edges connecting the input nodes to the templates nodes;
  - computing a similarity weight for a particular edge in the similarity graph, the particular edge connecting an input node representing an input element of the input document to a template node representing a template element in the template, based on comparing a shape and tag of the input element to a shape and tag of the template element;
  - computing a score for the template based on the similarity graph comprising the similarity weight associated with the particular edge of the similarity graph; and
  - selecting the template based on the score;
- using a prediction model trained in a generative adversarial network (GAN) to determine an interpolated layout from the input document and the template, wherein the interpolated layout represents an interpolation between the input document and the template; and
- generating an output document by modifying an input element of the input document to match an interpolated element represented in the interpolated layout.

16. The non-transitory computer-readable medium of claim 15, wherein computing the similarity weight further comprises:
- accessing a first similarity category associated with a first score and a second similarity category associated with a second score, wherein the first similarity category and the second similarity category are associated with element pairs;
- classifying, as belonging to the first similarity category, a similarity type applicable to the input element and the template element; and
- assigning, to the edge, the first score associated with the first similarity category based on the similarity type applicable to the input element and the template element belonging to the first similarity category.

17. The non-transitory computer-readable medium of claim 15, wherein computing the score for the template comprises:
- determining a first count of input elements in the input document and a second count of template elements in the template;
- computing a first content area size comprising area occupied by the input elements and a second content area size comprising area occupied by the template elements;
- determining respective types of the input elements and the template elements; and
- computing the score as a function of the first count, the second count, the first content area size, the second content area size, and the respective types of the input elements and the template elements.

18. The non-transitory computer-readable medium of claim 15, wherein using the prediction model trained in the GAN to determine the interpolated layout comprises:
- generating an input layout image representing the input document, wherein the input layout image comprises a first shape representing the input element of the input document, and wherein the first shape is associated with a first tag describing the input element;
- accessing a template layout image representing the template, wherein the template layout image comprises a second shape representing a template element of the template, and wherein the second shape is associated with a second tag describing the template element; and
- applying the prediction model trained in the GAN to predict an interpolated layout image from the input layout image and the template layout image.

19. The non-transitory computer-readable medium of claim 18, wherein the similarity weight of the particular edge between the input node and the template node is based on a similarity between the first shape and the second shape and is further based on a similarity between the first tag associated with the input element and the second tag associated with the template element.

20. The non-transitory computer-readable medium of claim 18, the operations further comprising training the prediction model through the GAN to predict a layout image that is interpolated from a first layout image and a second layout image, wherein training the prediction model through the GAN comprises:
- accessing training tuples, wherein each training tuple of the training tuples comprises a respective first layout image representing a respective first document, a respective second layout image representing a respective second document, and a respective direction of interpolation, and wherein each training tuple is associated with a respective interpolated layout image; and training the prediction model using the training tuples, wherein, for each training tuple, the respective first layout image, the respective second layout image, and the respective direction of interpolation are used as training inputs, and the respective interpolated layout image is used as an expected output.

* * * * *